US012713432B2

(12) United States Patent
Chae et al.

(10) Patent No.: US 12,713,432 B2
(45) **Date of Patent: *Aug. 18, 2026**

(54) WIRELESS COMMUNICATIONS FOR A SIDELINK

(71) Applicant: Comcast Cable Communications, LLC, Philadelphia, PA (US)

(72) Inventors: Hyukjin Chae, Fairfax, VA (US); Kyungmin Park, Vienna, VA (US); Yunjung Yi, Vienna, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,096

(22) Filed: Dec. 19, 2023

(65) Prior Publication Data

US 2024/0121782 A1 Apr. 11, 2024

Related U.S. Application Data

(63) Continuation of application No. 16/864,745, filed on May 1, 2020, now Pat. No. 11,895,651.

(60) Provisional application No. 62/842,235, filed on May 2, 2019.

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| | | | | |
|---|---|---|---|---|
| 10,451,712 | B1 | 10/2019 | Madhow et al. | |
| 10,764,890 | B2 * | 9/2020 | Lee | H04W 72/20 |
| 11,516,692 | B2 * | 11/2022 | Lee | H04W 28/021 |
| 11,895,651 | B2 * | 2/2024 | Chae | H04W 72/20 |
| 2012/0276936 | A1 | 11/2012 | Ahn et al. | |
| 2012/0320837 | A1 * | 12/2012 | Kim | H04L 5/0089 370/329 |
| 2016/0044618 | A1 | 2/2016 | Sheng et al. | |
| 2016/0044707 | A1 | 2/2016 | Folke et al. | |

(Continued)

FOREIGN PATENT DOCUMENTS

| | | | |
|---|---|---|---|
| CA | 3042831 | A1 | 5/2018 |
| WO | 2018004323 | A1 | 1/2018 |
| WO | 2019068926 | A1 | 4/2019 |

OTHER PUBLICATIONS

R1-1903943 3GPP TSG RAN WG1 Meeting #96bis, Xi'an, China, Apr. 8-12, 2019, Source: Huawei, HiSilicon, Title: Sidelink physical layer structure for NR V2X.

(Continued)

*Primary Examiner* — Nguyen H Ngo
(74) *Attorney, Agent, or Firm* — Banner & Witcoff, Ltd.

(57) ABSTRACT

Wireless communications between wireless devices are described. A wireless devices and/or a base station may determine at least one resource and/or time period for use with communications between wireless devices. The base station and/or the wireless device may schedule device-to-device communication, based on the determined resource(s) and/or time period(s), which may increase the likelihood of successful communications between wireless devices.

30 Claims, 33 Drawing Sheets

Receive, by a first wireless device from a base station, first configuration information of resource pool for a sidelink operation and second configuration information of a sidelink reception gap comprising a set of time intervals for allowing reception of a sidelink signal by a second wireless device
2905

Determine, by the first wireless device, based on the resource pool and the sidelink reception gap, one or more transmission resources for sidelink signal transmission to the second wireless device
2910

Transmit one or more sidelink signals to the second wireless device based on the one or more transmission resources.
2915

(56) References Cited

U.S. PATENT DOCUMENTS

| | | | | |
|---|---|---|---|---|
| 2016/0262034 | A1 | 9/2016 | Gulati et al. | |
| 2016/0295430 | A1* | 10/2016 | Jung | H04L 5/0053 |
| 2017/0026939 | A1* | 1/2017 | Fodor | H04W 72/23 |
| 2017/0310415 | A1* | 10/2017 | Thangarasa | H04W 72/12 |
| 2019/0036738 | A1* | 1/2019 | Miao | H04L 25/02 |
| 2019/0069312 | A1 | 2/2019 | Oh et al. | |
| 2019/0150147 | A1* | 5/2019 | Lee | H04W 72/0446 370/336 |
| 2019/0158229 | A1 | 5/2019 | Wei et al. | |
| 2019/0281636 | A1* | 9/2019 | Liu | H04W 16/14 |
| 2020/0045674 | A1 | 2/2020 | Tseng et al. | |
| 2020/0045724 | A1* | 2/2020 | Lu | H04W 72/121 |
| 2020/0053702 | A1 | 2/2020 | Cheng et al. | |
| 2020/0187163 | A1* | 6/2020 | Lu | H04W 72/23 |
| 2020/0229189 | A1* | 7/2020 | Kwak | H04W 72/0453 |
| 2020/0304940 | A1 | 9/2020 | Thangarasa et al. | |
| 2021/0337409 | A1 | 10/2021 | Xue et al. | |
| 2021/0385857 | A1* | 12/2021 | Kwak | H04W 74/0833 |

OTHER PUBLICATIONS

R1-1903950 3GPP TSG RAN WG1 Meeting #96bis, Xi'an, China, Apr. 8-12, 2019, Source: Huawei, HiSilicon, Title: Discussion on sidelink resource allocation mode 1.

R1-1904072 3GPP TSG RAN WG1 Meeting #96bis, Xi'an, China, Apr. 8-12, 2019, Source: Vivo, Title: Physical layer structure for NR sidelink.

R1-1904294 3GPP TSG RAN WG1 Meeting #96bis, Xi'an, China, Apr. 8-12, 2019, Source: Intel Corporation, Title: Sidelink Physical Structure for NR V2X Communication.

R1-1904328 3GPP TSG RAN WG1 Meeting #96bis, Xi'an, China, Apr. 8-12, 2019, Source: Fraunhofer HHI, Fraunhofer IIS, Title: Design of NR V2X Physical Layer Structures.

R1-1904419 3GPP TSG RAN WG1 Meeting #96bis, Xi'an, China, Apr. 8-12, 2019, Source: Samsung, Title: On physical layer structures for NR V2X.

R1-1904492 3GPP TSG RAN WG1 Meeting #96bis, Xi'an, China, Apr. 8-12, 2019, Source: MediaTek Inc., Title: On sidelink physical layer structure.

R1-1904575 3GPP TSG RAN WG1 Meeting #96bis, Xi'an, China, Apr. 8-12, 2019, Source: Lenovo, Motorola Mobility, Title: Physical layer structures in NR V2X.

R1-1904652 3GPP TSG RAN WG1 Meeting #96bis, Xi'an, China, Apr. 8-12, 2019, Source: NEC, Title: Physical layer structure for NR sidelink.

R1-1904793 3GPP TSG RAN WG1 Meeting #96bis, Xi'an, China, Apr. 8-12, 2019, Source: Spreadtrum Communications, Title: Discussion on physical layer structure for sidelink.

R1-1904805 3GPP TSG RAN WG1 Meeting #96bis, Xi'an, China, Apr. 8-12, 2019, Source: TCL Communications, Title: Physical Layer Structure for Sidelink.

R1-1904814 3GPP TSG RAN WG1 Meeting #96bis, Xi'an, China, Apr. 8-12, 2019, Source: ZTE, Sanechips, Title: NR sidelink physical layer structure.

R1-1904906 3GPP TSG RAN WG1 Meeting #96bis, Xi'an, China, Apr. 8-12, 2019, Source: China Telecom. Title: On Physical Layer Structure for NR sidelink.

R1-1904917 3GPP TSG RAN WG1 Meeting #96bis, Xi'an, China, Apr. 8-12, 2019, Source: OPPO, Title: Physical layer structure for NR-V2X.

R1-1905008 3GPP TSG RAN WG1 Meeting #96bis, Xi'an, China, Apr. 8-12, 2019, Source: Qualcomm Incorporated, Title: Considerations on Physical Layer aspects of NR V2X.

R1-1905088 3GPP TSG RAN WG1 Meeting #96bis, Xi'an, China, Apr. 8-12, 2019, Source: ASUSTeK, Title: Discussion on sidelink structure in NR V2X.

R1-1905099 3GPP TSG RAN WG1 Meeting #96bis, Xi'an, China, Apr. 8-12, 2019, Source: ITL, Title: Physical layer structure for NR V2X.

R1-1905123 3GPP TSG RAN WG1 Meeting #96bis, Xi'an, China, Apr. 8-12, 2019, Source: Mitsubishi Electric, Title: Views on physical layer design for NR V2X sidelink.

R1-1905332 3GPP TSG RAN WG1 Meeting #96bis, Xi'an, China, Apr. 8-12, 2019, Source: Nokia, Nokia Shanghai Bell, Title: Discussion of physical layer structure for sidelink.

R1-1905351 3GPP TSG RAN WG1 Meeting #96bis, Xi'an, China, Apr. 8-12, 2019, Source: CATT, Title: Discussion on physical layer structure in NR V2X.

R1-1905374 3GPP TSG RAN WG1 Meeting #96bis, Xi'an, China, Apr. 8-12, 2019, Source: Fujitsu, Title: Discussion on physical layer structure for NR sidelink.

R1-1905380 3GPP TSG RAN WG1 Meeting #96bis, Xi'an, China, Apr. 8-12, 2019, Source: Panasonic, Title: Discussion on physical layer structure for sidelink in NR V2X.

R1-1905391 3GPP TSG RAN WG1 Meeting #96bis, Xi'an, China, Apr. 8-12, 2019, Source: Sharp, Title: Physical layer structure for NR sidelink.

R1-1905400 3GPP TSG RAN WG1 Meeting #96bis, Xi'an, China, Apr. 8-12, 2019, Source: InterDigital Inc., Title: On Physical Layer Structure for NR V2X Sidelink.

R1-1905412 3GPP TSG RAN WG1 Meeting #96bis, Xi'an, China, Apr. 8-12, 2019, Source: Xiaomi, Title: Discussion on physical layer structure for 5G V2X.

R1-1905421 3GPP TSG RAN WG1 Meeting #96bis, Xi'an, China, Apr. 8-12, 2019, Source: NTT DOCOMO, Inc., Title: NR Sidelink Physical Layer Structure.

R1-1905437 3GPP TSG RAN WG1 Meeting #96bis, Xi'an, China, Apr. 8-12, 2019, Source: LG Electronics, Title: Discussion on physical layer structure for NR sidelink.

R1-1905665 3GPP TSG RAN WG1 Meeting #96bis, Xi'an, China, Apr. 8-12, 2019, Source: Samsung, Title: Feature lead summary for agenda item 7.2.4.1 Physical layer structure for sidelink.

R1-1905834 3GPP TSG-RAN WG1 Meeting #96bis, Xi'an, China, Apr. 8-12, 2019, Source: Ericsson, Title: Feature lead summary #2 on Resource allocation for NR sidelink. Mode 1.

R1-1905877 3GPP TSG RAN WG1 Meeting #96bis, Xi'an, China, Apr. 8-12, 2019, Source: Samsung, Title: Feature lead summary#3 for 7.2.4.1 Physical layer structure for sidelink.

Liu, Xiaofeng, et. al., "Congestion Control in V2V Safety Communication: Problem, Analysis, Approaches." Electronics 8, No. 540 (2019); Published May 13, 2019. doi:10.3390/electronics8050540.

Naik, Gaurang, et. al., "IEEE 802.11bd & 5G NR V2X: Evolution of Radio Access Technologies for V2X Communications." Published Mar. 26, 2019.

Sep. 8, 2020, Extended European Search Report, EP 20172596.7.

Huawei et al., "BWP operation for V2X sidelink", 3GPP TSG RAN WG1 Meeting #96bis, R1-1904690, Xi'an, China, Apr. 8-12, 2019.

Dec. 14, 20224—EP Office Action—EP App. No. 20172596.7.

* cited by examiner

User Plane Protocol Stack

Control Plane Protocol Stack

WIRELESS COMMUNICATIONS FOR A SIDELINK

CROSS-REFERENCE TO RELATED APPLICATIONS

This application is a continuation of and claims priority to U.S. patent application Ser. No. 16/864,745, filed May 1, 2020, which claims the benefit of U.S. Provisional Application No. 62/842,235, filed on May 2, 2019, each of which is hereby incorporated by reference in its entirety.

BACKGROUND

Wireless devices may communicate with a base station and/or with other wireless devices. Wireless devices may communicate directly with each other via a sidelink.

SUMMARY

The following summary presents a simplified summary of certain features. The summary is not an extensive overview and is not intended to identify key or critical elements.

Wireless communications are described including, but not limited to, device-to-device communications, vehicle-to-everything communications, vehicle-to-vehicle communications, vehicle-to-network communications, vehicle-to-roadside infrastructure communications, vehicle-to-pedestrian communications, and/or direct communications, such as via a sidelink A wireless device may not be able to send and/or receive information to/from another wireless device, for example, via a sidelink A wireless device may not be able to determine whether another wireless device may be able to send and/or receive information to it. If a wireless device sends a message to another wireless device during a time at which the other wireless device is unable to receive it, the sending wireless device may need to resend the message. Resending a message may consume additional power and/or reduce efficiency of wireless communications. To avoid this problem, at least one wireless resource and/or time period may be determined for wireless devices to communicate with each other, for example, via a sidelink A base station may avoid interrupting sidelink communication, and/or a wireless device may avoid interruptions, based on the determined wireless resource(s) and/or time period(s). Wireless resources (e.g., subcarriers, bandwidth parts, etc.) may be coordinated so that interruptions (e.g., due to bandwidth part switching and/or any or other wireless resource change) may be reduced, which may improve wireless communications.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
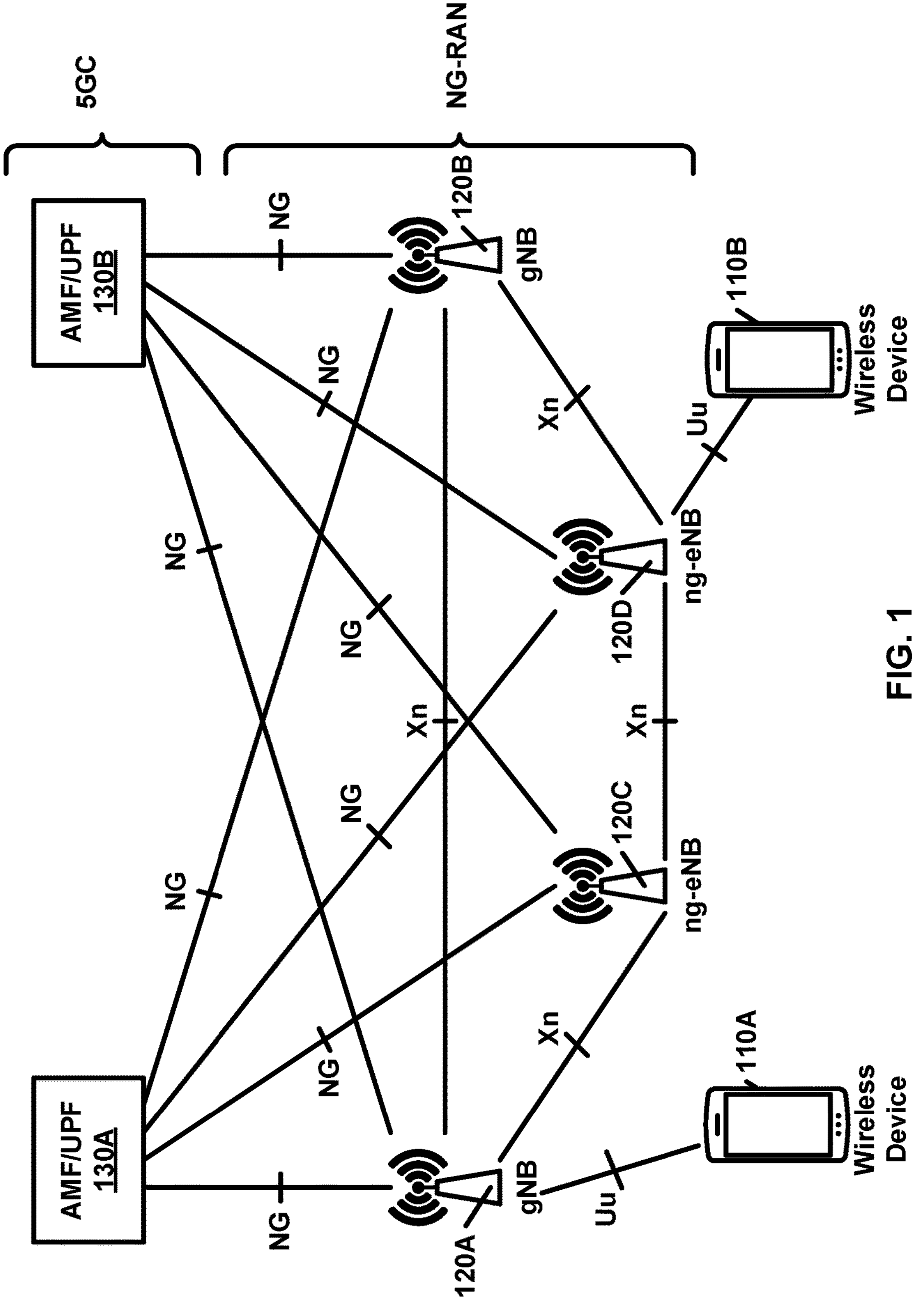
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

The accompanying drawings and descriptions provide examples. It is to be understood that the examples shown in the drawings and/or described are non-exclusive and that there are other examples of how features shown and described may be practiced. Examples are provided for operation of wireless communication systems which may be used in the technical field of multicarrier communication systems. More particularly, the technology described herein may relate sidelink communications for wireless devices.

The following acronyms are used throughout the drawings and/or descriptions, and are provided below for convenience although other acronyms may be introduced in the detailed description:

3GPP $3^{rd}$ Generation Partnership Project
5G $5^{th}$ generation mobile networks
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CBR Channel Busy Ratio
CC Component Carrier
CCCH Common Control Channel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CR Channel Occupancy Ratio
CS Configured Scheduling
CSI Channel State Information
CSI-RS Channel State Information-Reference Signal
CQI Channel Quality Indicator
CRI CSI-RS resource indicator
CSS Common Search Space
CU Central Unit
D2D device to device
DC Dual Connectivity
DCCH Dedicated Control Channel
DCI Downlink Control Information
DL Downlink
DL-SCH Downlink Shared Channel
DM-RS DeModulation Reference Signal
DRB Data Radio Bearer
DRX Discontinuous Reception
DTCH Dedicated Traffic Channel
DU Distributed Unit
eNB evolved Node B
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
GNSS Global Navigation Satellite System
GPS Global Positioning System
gNB next generation Node B
HARQ Hybrid Automatic Repeat request
HDL Hardware Description Languages
IE Information Element
IBE In-Band Emission
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MIMO
MME Mobility Management Entity
MN Master Node
MU-MIMO multi-user-MIMO
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NR UE New Radio UE
NSSAI Network Slice Selection Assistance Information
O&M Operation and Maintenance
OFDM Orthogonal Frequency Division Multiplexing
PBCH Physical Broadcast Channel
PCC Primary Component Carrier
PCCH Paging Control Channel
Pcell Primary Cell
PCH Paging Channel
PDCCH Physical Downlink Control Channel
PDCP Packet Data Convergence Protocol
PDSCH Physical Downlink Shared Channel
PDU Protocol Data Unit
PHICH Physical HARQ Indicator Channel
PHY PHYsical
PLMN Public Land Mobile Network
PMI Precoding Matrix Indicator
PRACH Physical Random Access Channel
PRB Physical Resource Block
PSBCH Physical Sidelink Broadcast Channel
PSCCH Physical Sidelink Control Channel
PSCell Primary Secondary Cell
PSDCH Physical Sidelink Discovery Channel
PSS Primary Synchronization Signal
PSSCH Physical Sidelink Shared Channel
pTAG primary Timing Advance Group
PT-RS Phase Tracking Reference Signal PUCCH Physical Uplink Control Channel
PUSCH Physical Uplink Shared Channel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access Channel
RAN Radio Access Network
RAT Radio Access Technology
RA-RNTI Random Access-Radio Network Temporary Identifier
RB Resource Blocks
RBG Resource Block Groups
RE Resource Element
RI Rank indicator
RLC Radio Link Control
RLM Radio Link Monitoring
RNTI Radio Network Temporary Identifier
RRC Radio Resource Control
RRM Radio Resource Management
RS Reference Signal
RSSI Received Signal Strength Indicator
RSU Roadside Unit
RV Redundancy Version
RSRP Reference Signal Received Power
S-PSS Sidelink Primary Synchronization Signal
S-SSB Sidelink Synchronization Signal Block
S-SSS Sidelink Secondary Synchronization Signal
SCC Secondary Component Carrier
Scell Secondary Cell
SCG Secondary Cell Group
SCS
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SLSS Sidelink Synchronization Signal
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared Channel
UPF User Plane Function
UPGW User Plane Gateway
URLLC Ultra-Reliable Low-Latency Communication
V2X Vehicle-to-everything
V2P Vehicle-to-pedestrian
V2V Vehicle-to-vehicle
V2I Vehicle-to-infrastructure
V2N Vehicle-to-network
V2I/N Vehicle-to-infrastructure/network
VHDL VHSIC Hardware Description Language
VHSIC Very High Speed Integrated Circuit
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
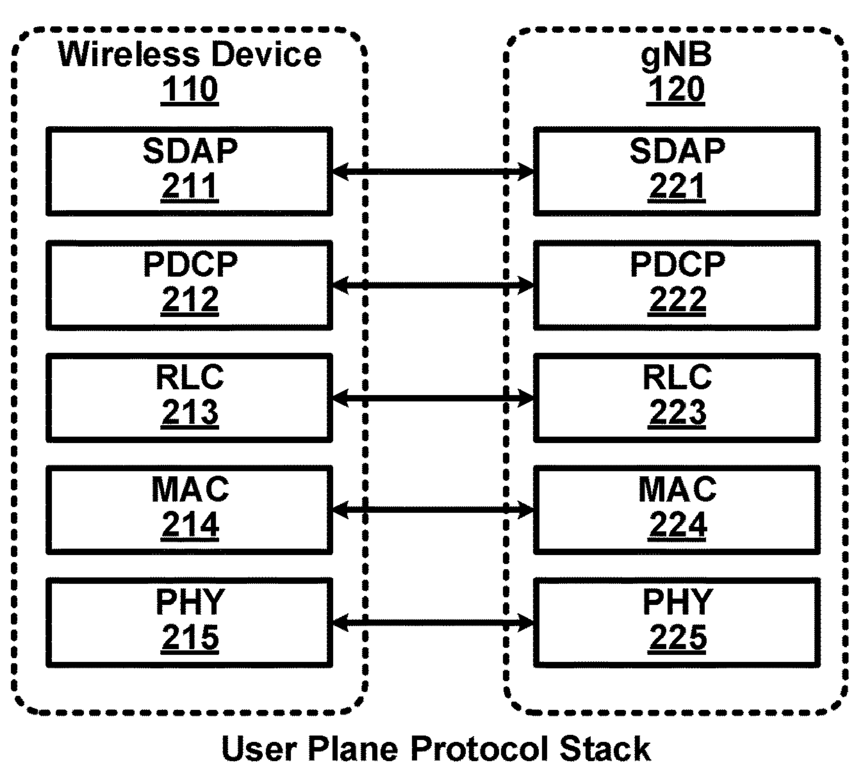
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TB s) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
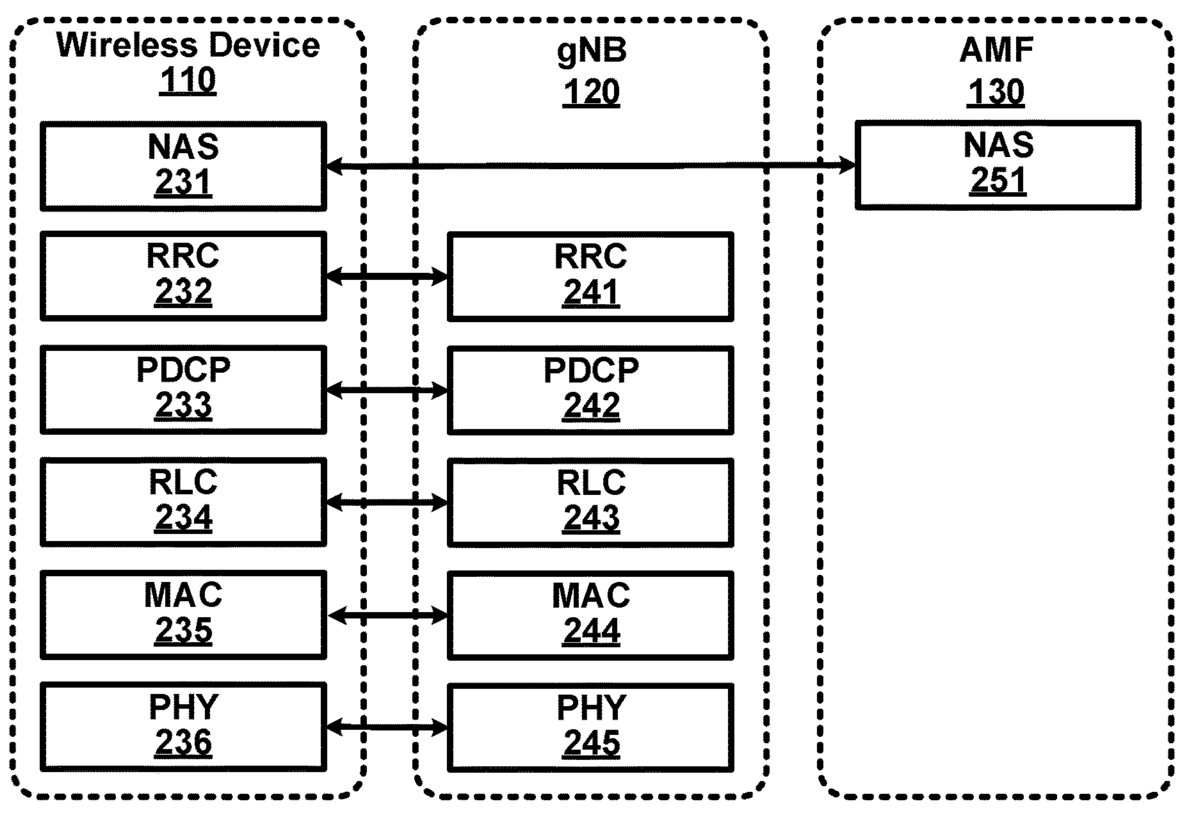
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel Identifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
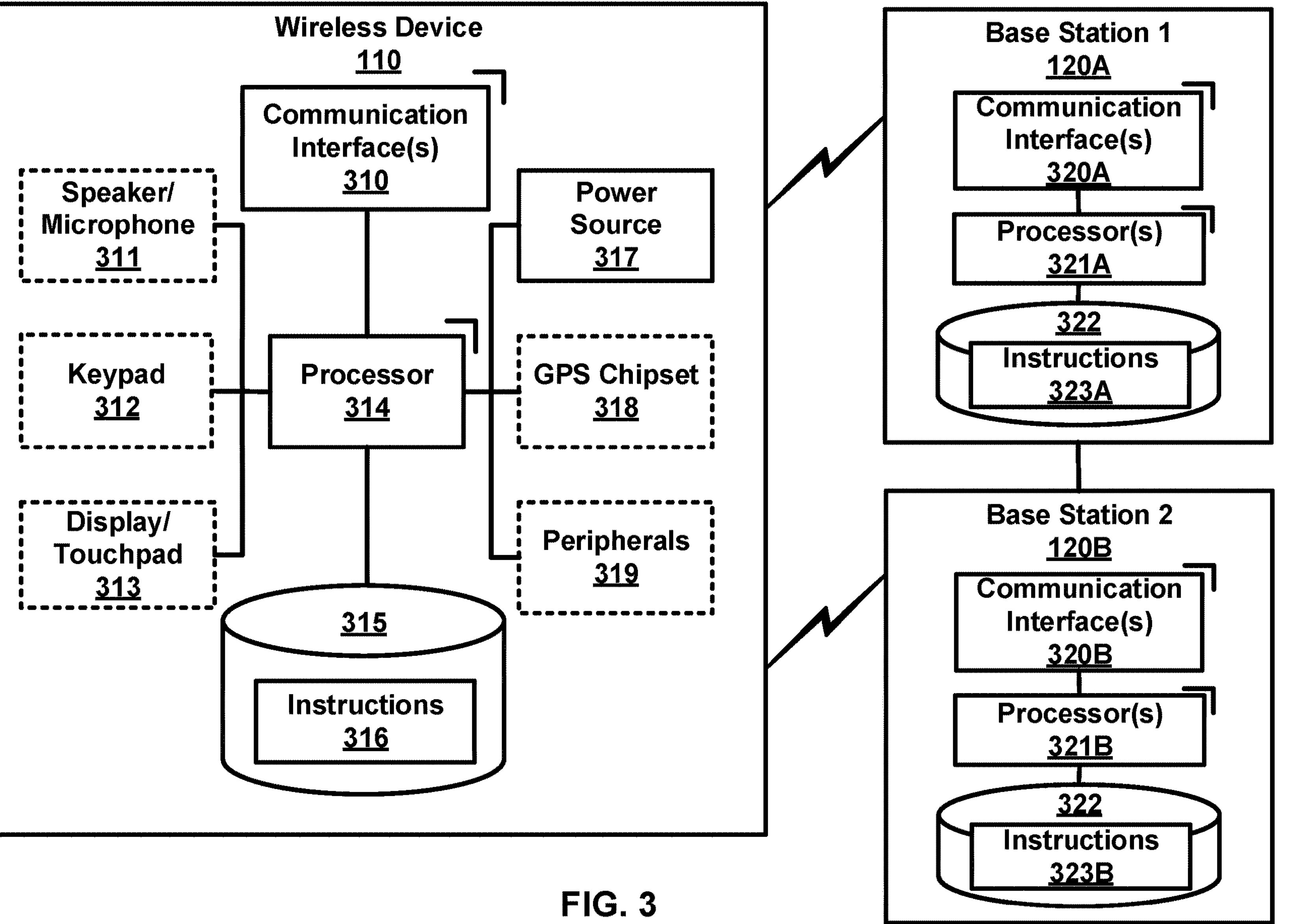
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (Pcell). In the downlink, a carrier corresponding to the Pcell may be a DL Primary Component Carrier (PCC). In the uplink, a carrier may be an UL PCC. Secondary Cells (Scells) may be configured to form together with a Pcell a set of serving cells, for example, depending on wireless device capabilities. In a downlink, a carrier corresponding to an Scell may be a downlink secondary component carrier (DL SCC). In an uplink, a carrier may be an uplink secondary component carrier (UL SCC). An Scell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the Pcell. Scells may be configured to form together with the Pcell a set of serving cells, for example, depending on the capabilities of the wireless device. The configured set of serving cells for the wireless device may comprise a Pcell and one or more Scells.

The reconfiguration, addition, and/or removal of Scells may be performed by RRC messaging. At intra-NR handover, RRC may add, remove, and/or reconfigure Scells for usage with the target Pcell. Dedicated RRC signaling may be used (e.g., if adding a new Scell) to send all required system information of the Scell (e.g., if in connected mode, wireless devices may not acquire broadcasted system information directly from the Scells).

The purpose of an RRC connection reconfiguration procedure may be to modify an RRC connection, (e.g., to establish, modify, and/or release RBs; to perform handover; to setup, modify, and/or release measurements, for example, to add, modify, and/or release Scells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an Scell release, for example, if the received RRC Connection Reconfiguration message includes the sCellToReleaseList. The wireless device may perform Scell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figures 4A, 4B, 4C, 4D:
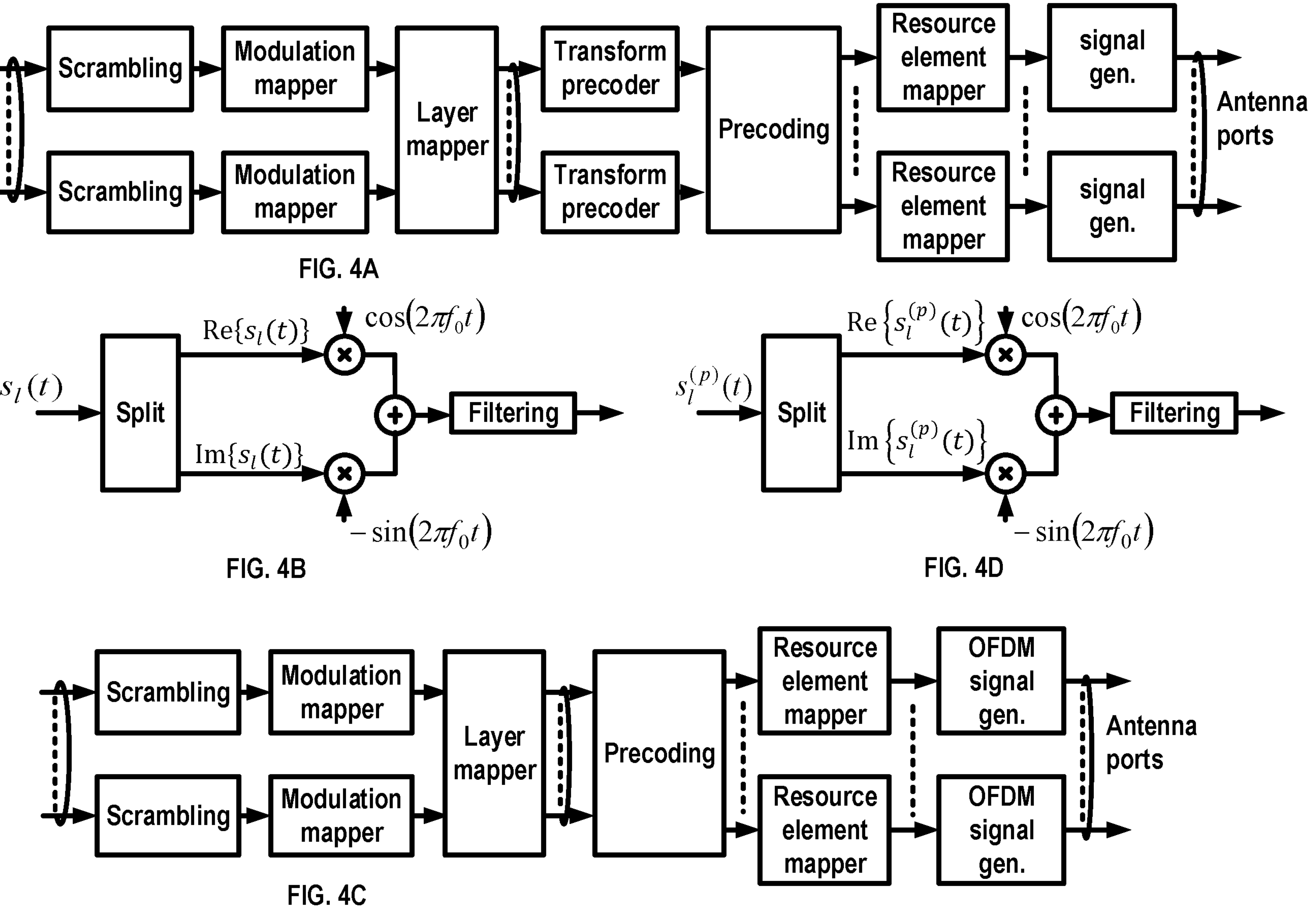
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access Channel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
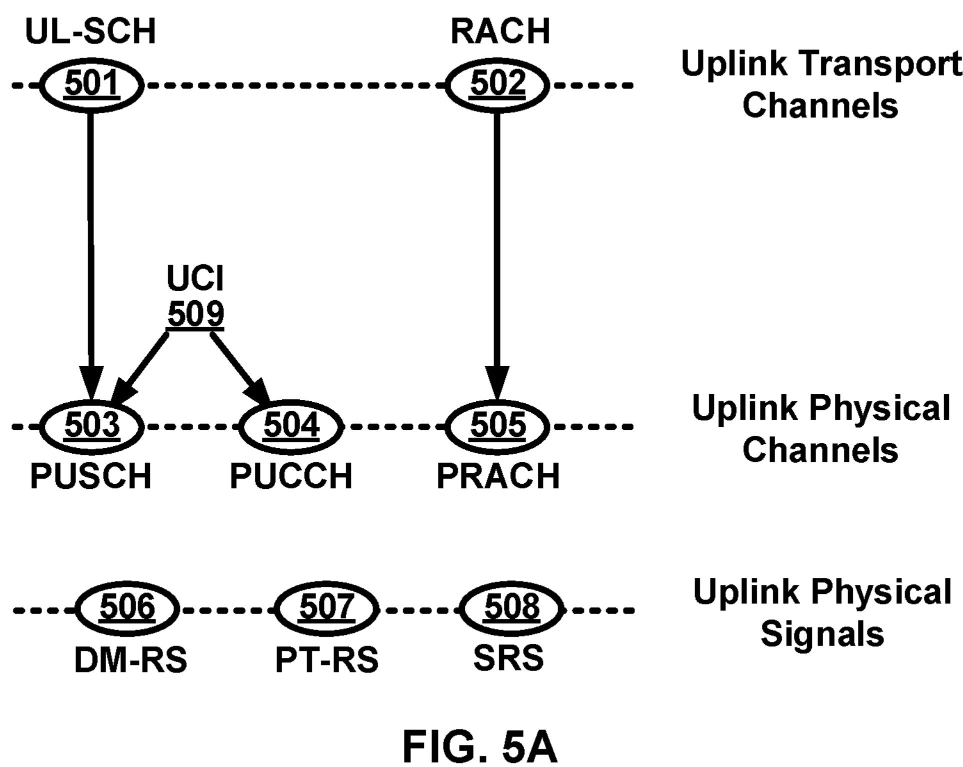
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared Channel (UL-SCH) 501 and/or a Random Access Channel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a D-MRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
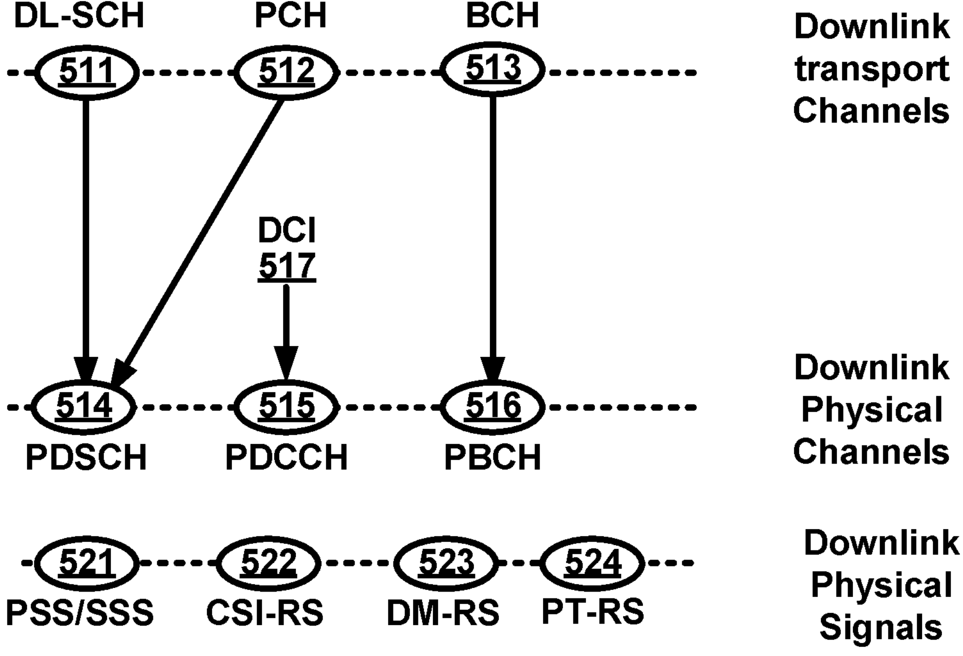
FIG. 5B shows an example downlink channel mapping and example downlink physical signals.

FIG. 5B shows an example downlink channel mapping and downlink physical signals. Downlink transport channels may comprise a Downlink-Shared Channel (DL-SCH) 511, a Paging Channel (PCH) 512, and/or a Broadcast Channel (BCH) 513. A transport channel may be mapped to one or more corresponding physical channels. A UL-SCH 501 may be mapped to a Physical Uplink Shared Channel (PUSCH) 503. A RACH 502 may be mapped to a PRACH 505. A DL-SCH 511 and a PCH 512 may be mapped to a Physical Downlink Shared Channel (PDSCH) 514. A BCH 513 may be mapped to a Physical Broadcast Channel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control Channel (PUCCH) 504 may carry UCI 509 from a wireless device to a base station. A Physical Downlink Control Channel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
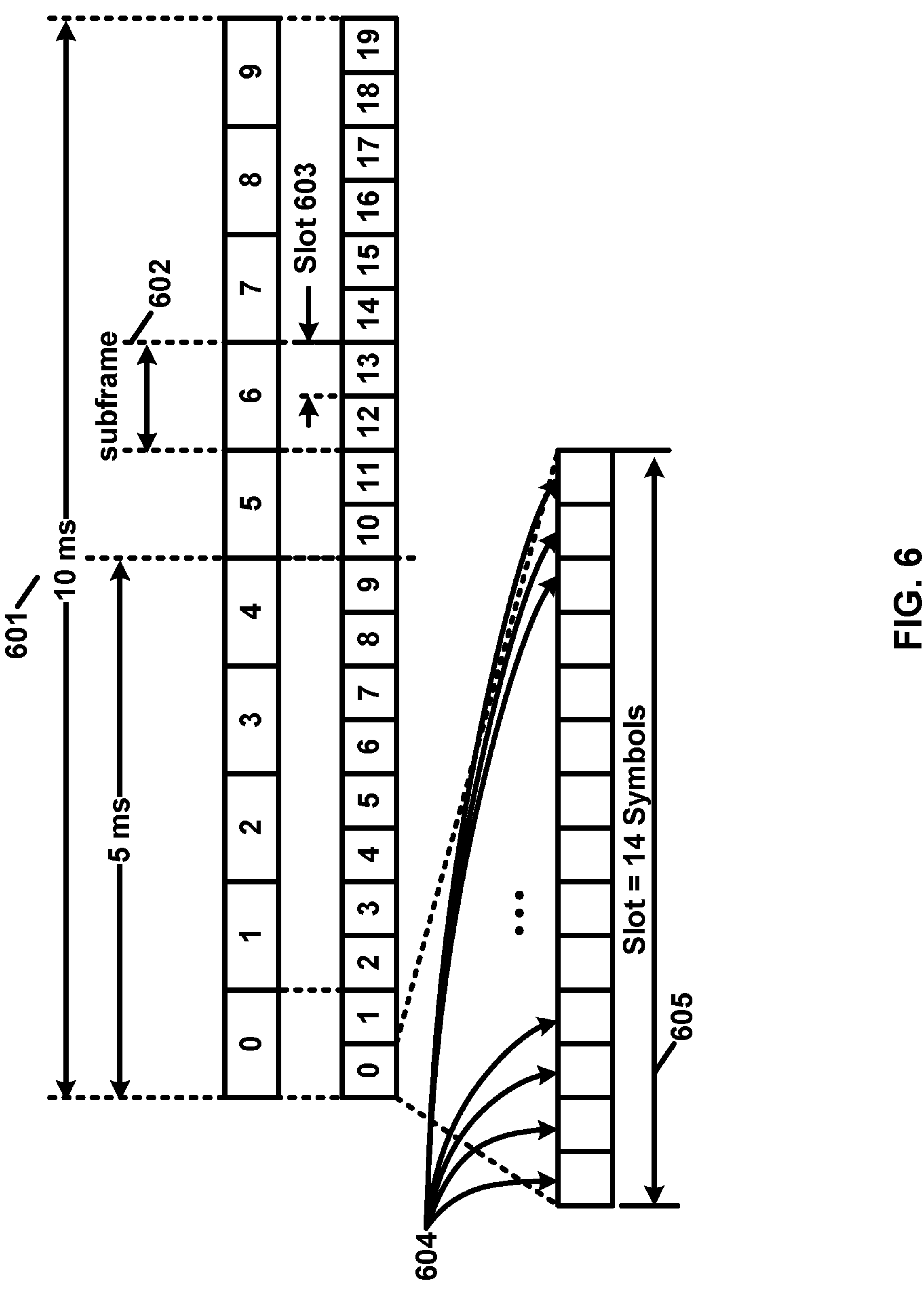
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figures 7A, 7B:
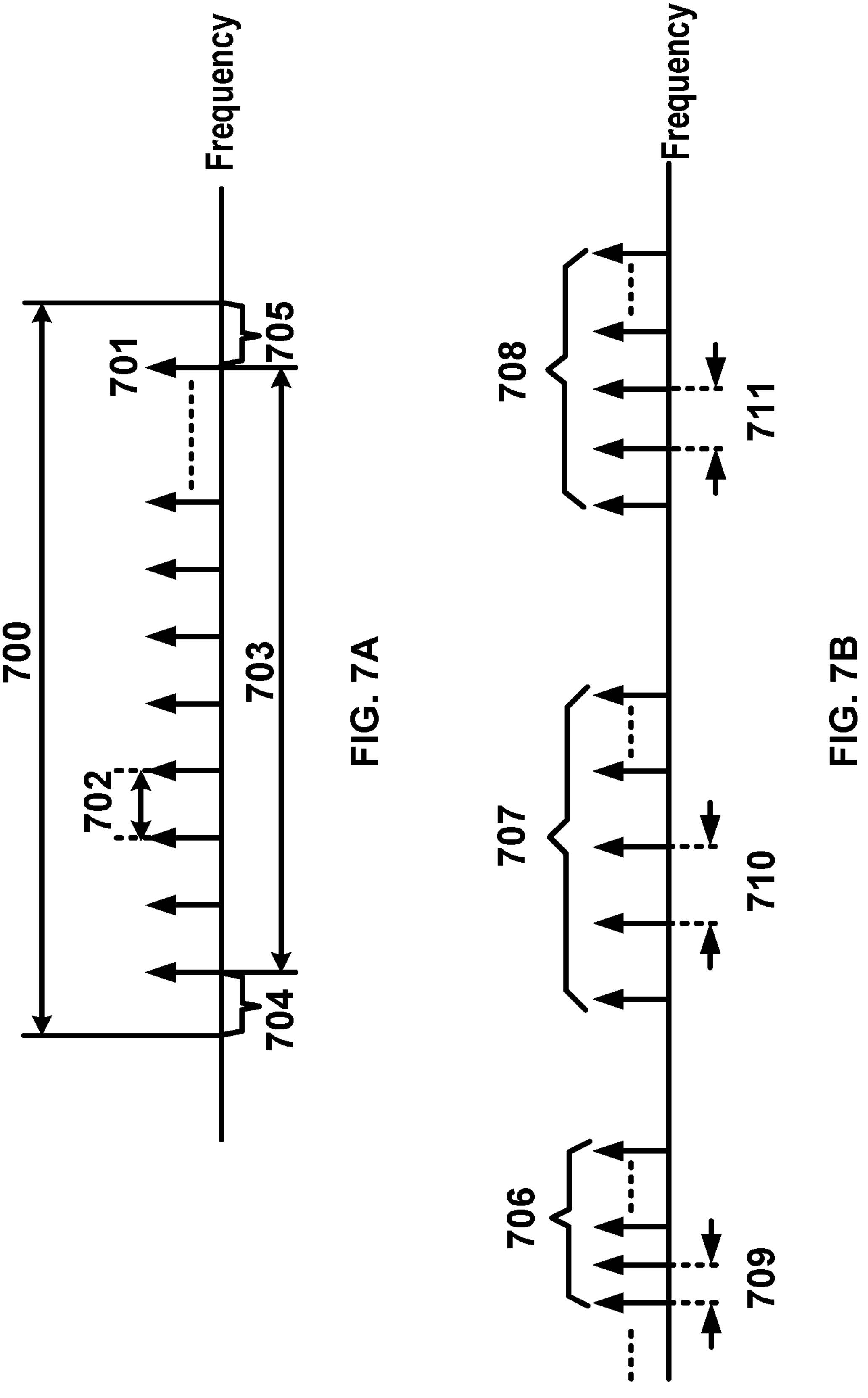
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
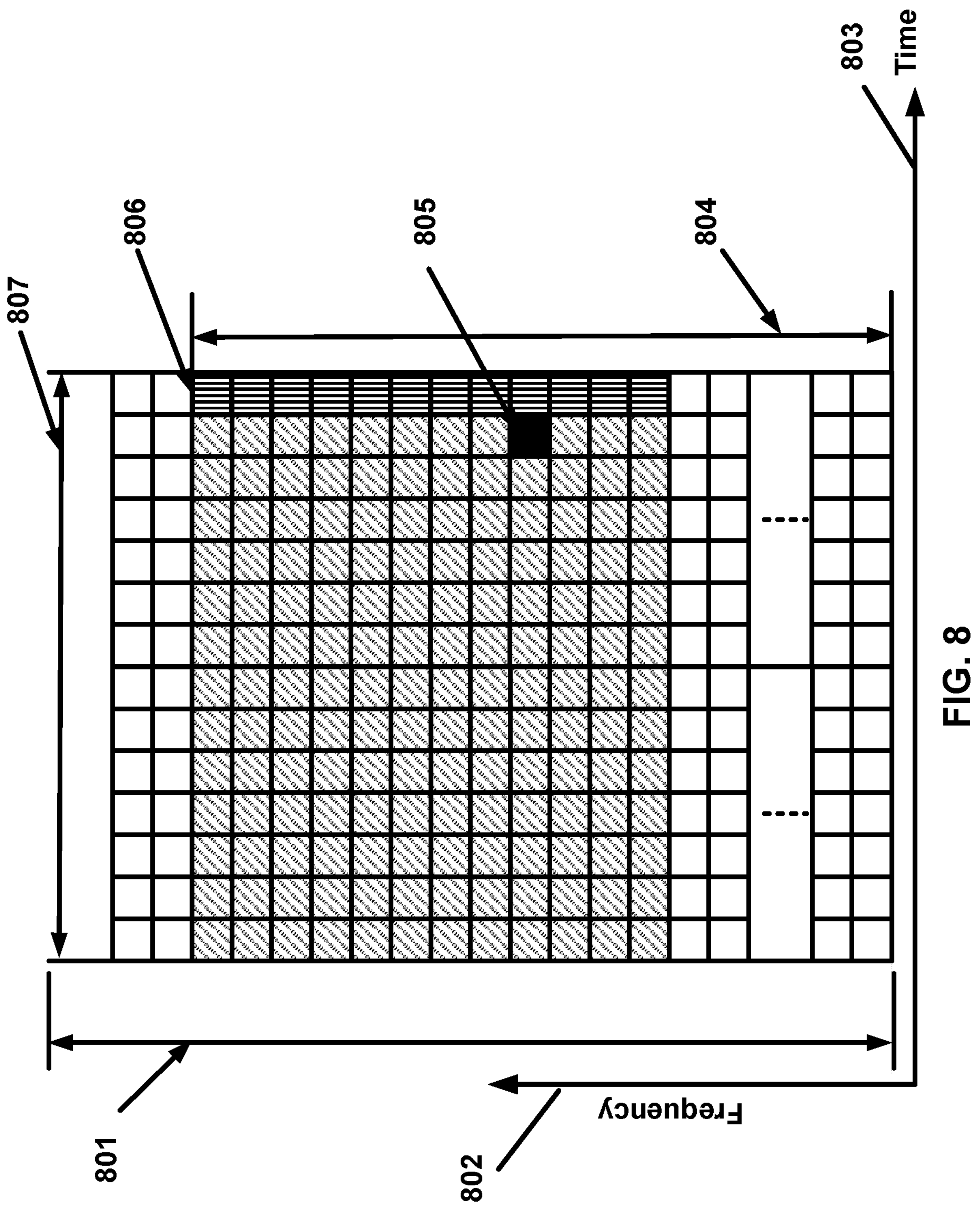
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message (s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a pre-emption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figures 9A, 9B:
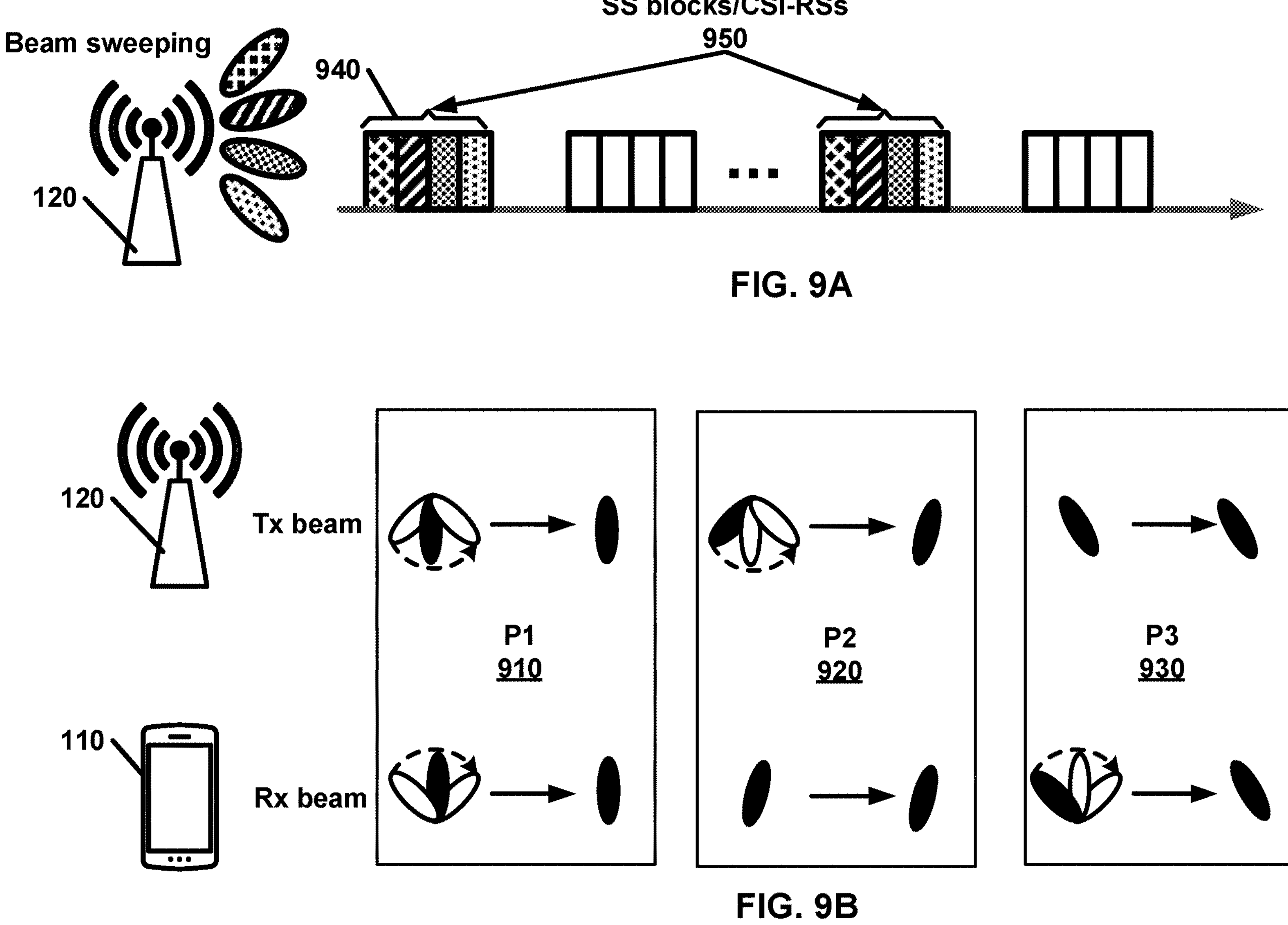
FIG. 9A shows an example channel state information reference signal (CSI-RS) and/or synchronization signal (SS) block transmission in a multi-beam system.
FIG. 9B shows an example downlink beam management procedure.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming an SS burst 940, for example, in a multi-beam operation. One or more SS blocks may be sent (e.g., transmitted) on one beam. If multiple SS bursts 940 are transmitted with multiple beams, the SS bursts 940 together may form the SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
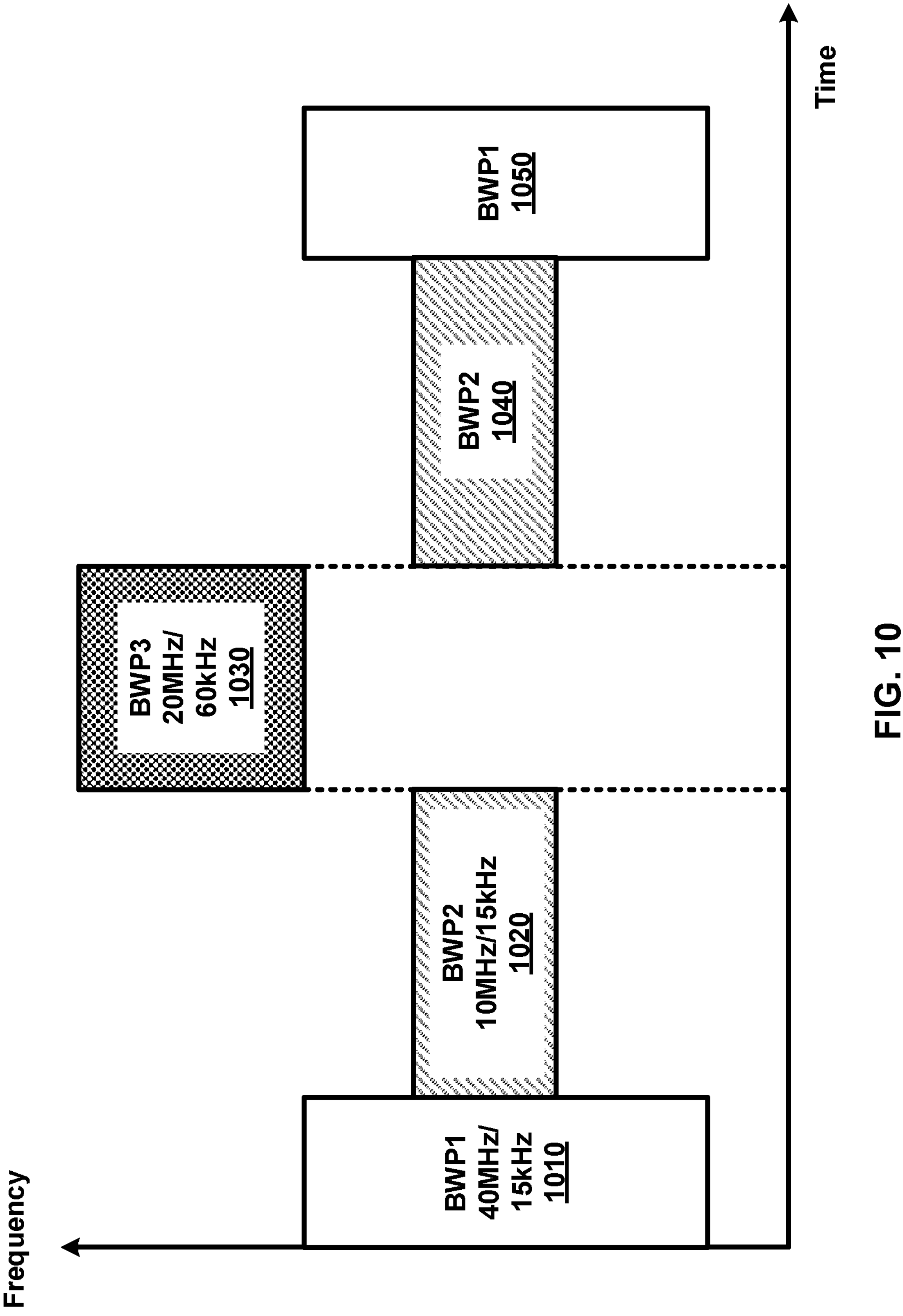
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the Pcell. To enable BA on Scells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the Pcell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a Pcell, a base station may configure a wireless device with one or more control resource sets for at least one type of common search space and/or one wireless device-specific search space. A base station may refrain from configuring a wireless device without a common search space on a Pcell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a Pcell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a Pcell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
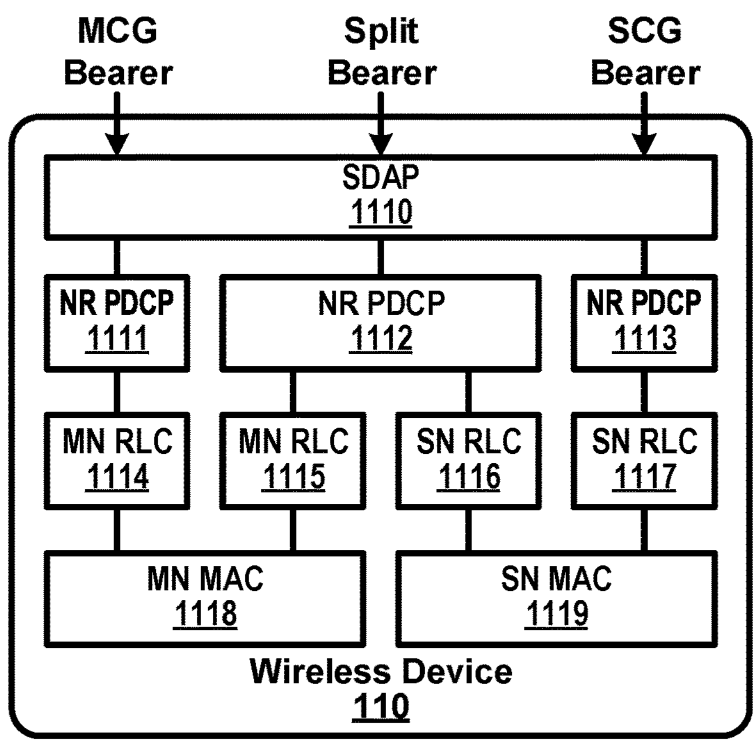
FIG. 11A and FIG. 11B show examples of multi connectivity.
Figure 11B:
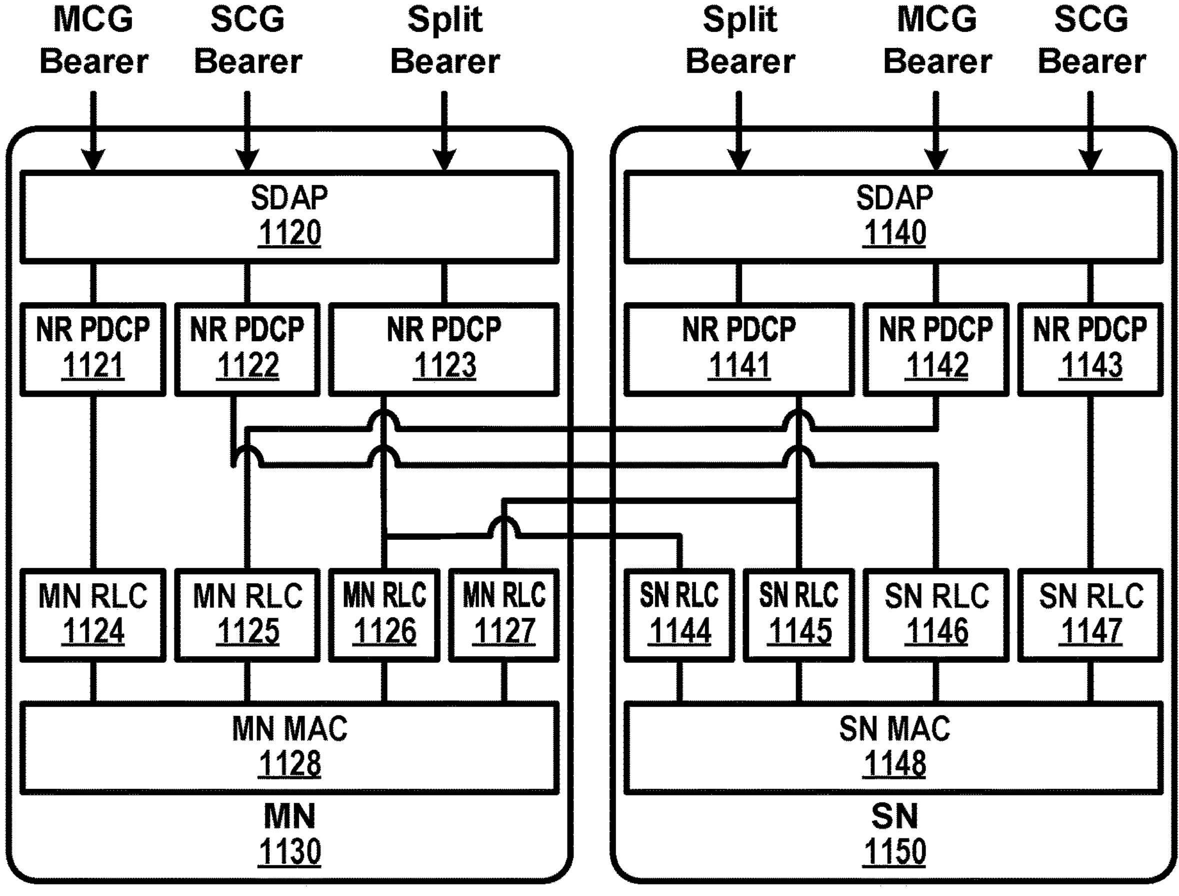

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., SN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, Pcell of SCG, Pcell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A Pcell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG Scell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG Scell, except for an SFN acquired from an MIB of a PSCell of a SCG.

Figure 12:
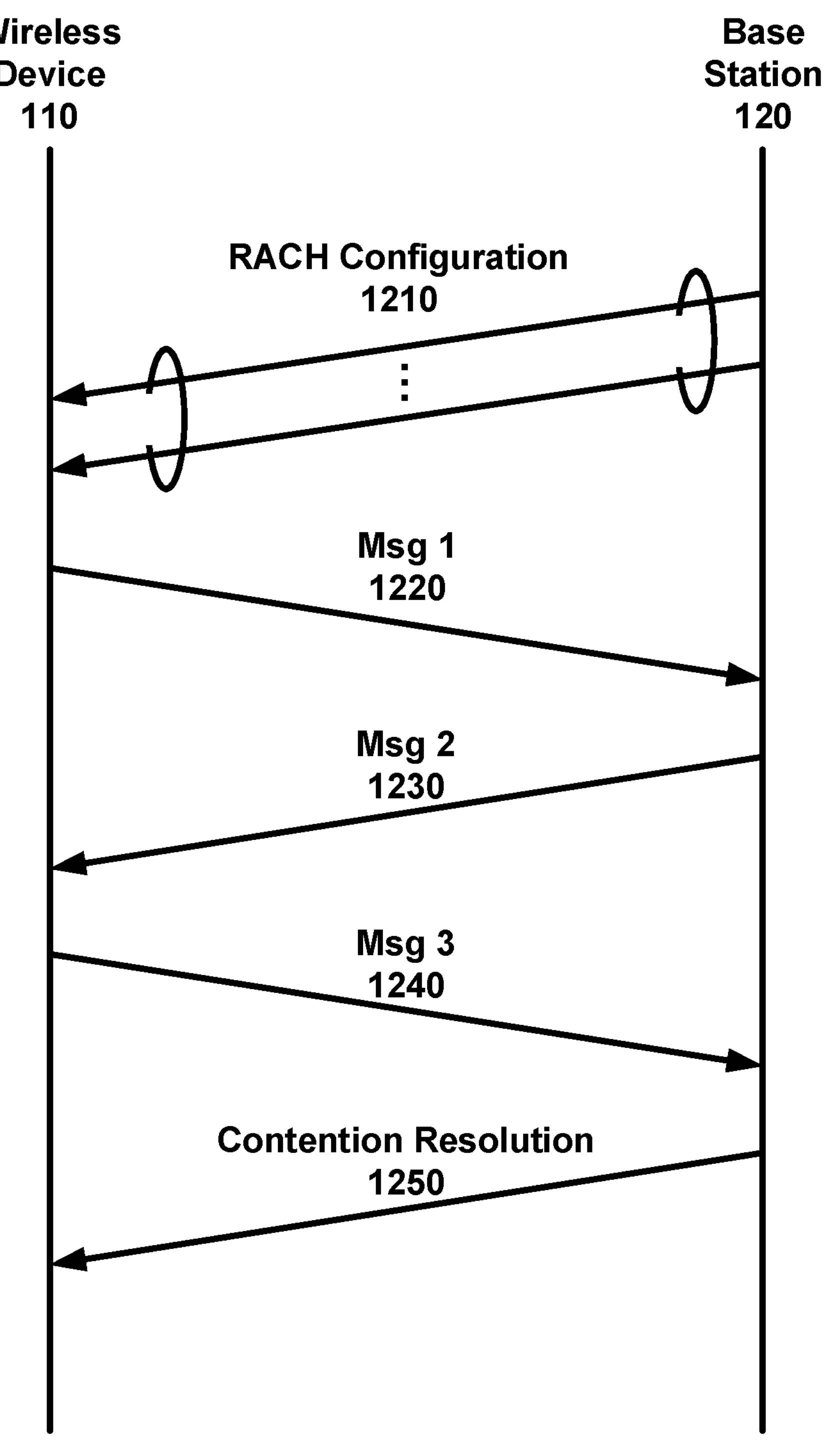
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg 1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg 1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the random access procedure is successfully completed.

Figure 13:
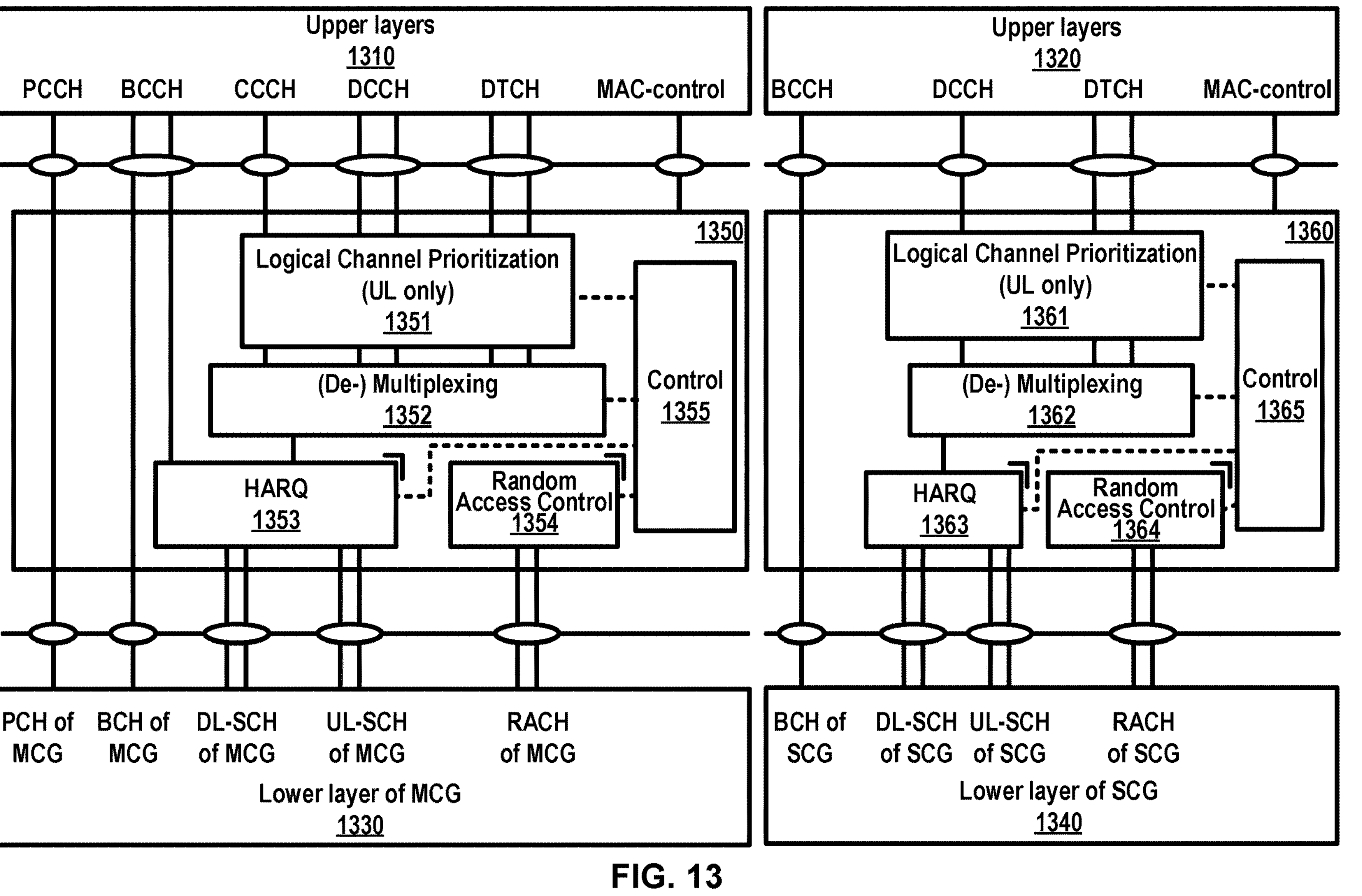
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a Pcell of a SCG, or a Pcell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more Scells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an Scell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
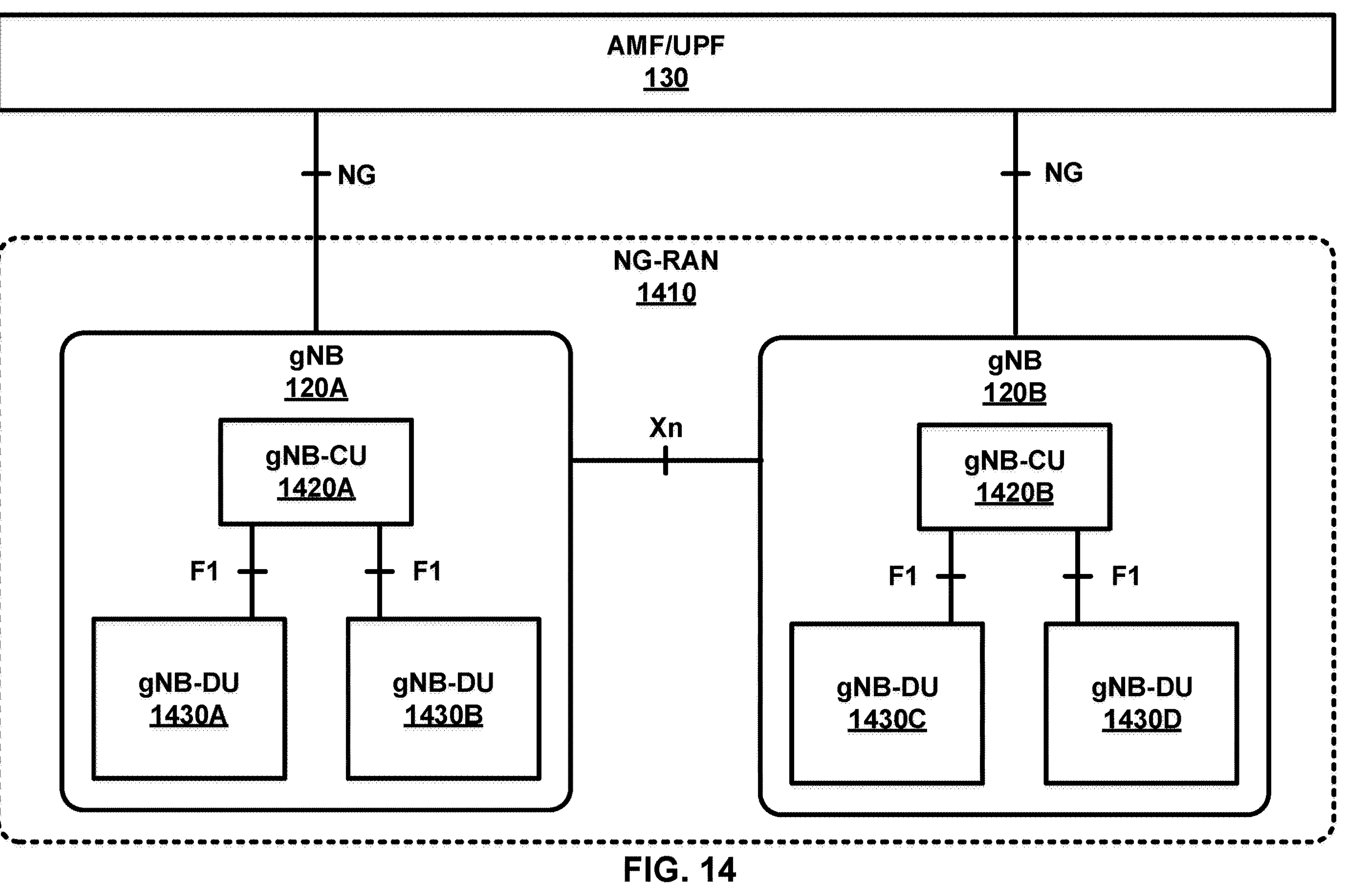
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
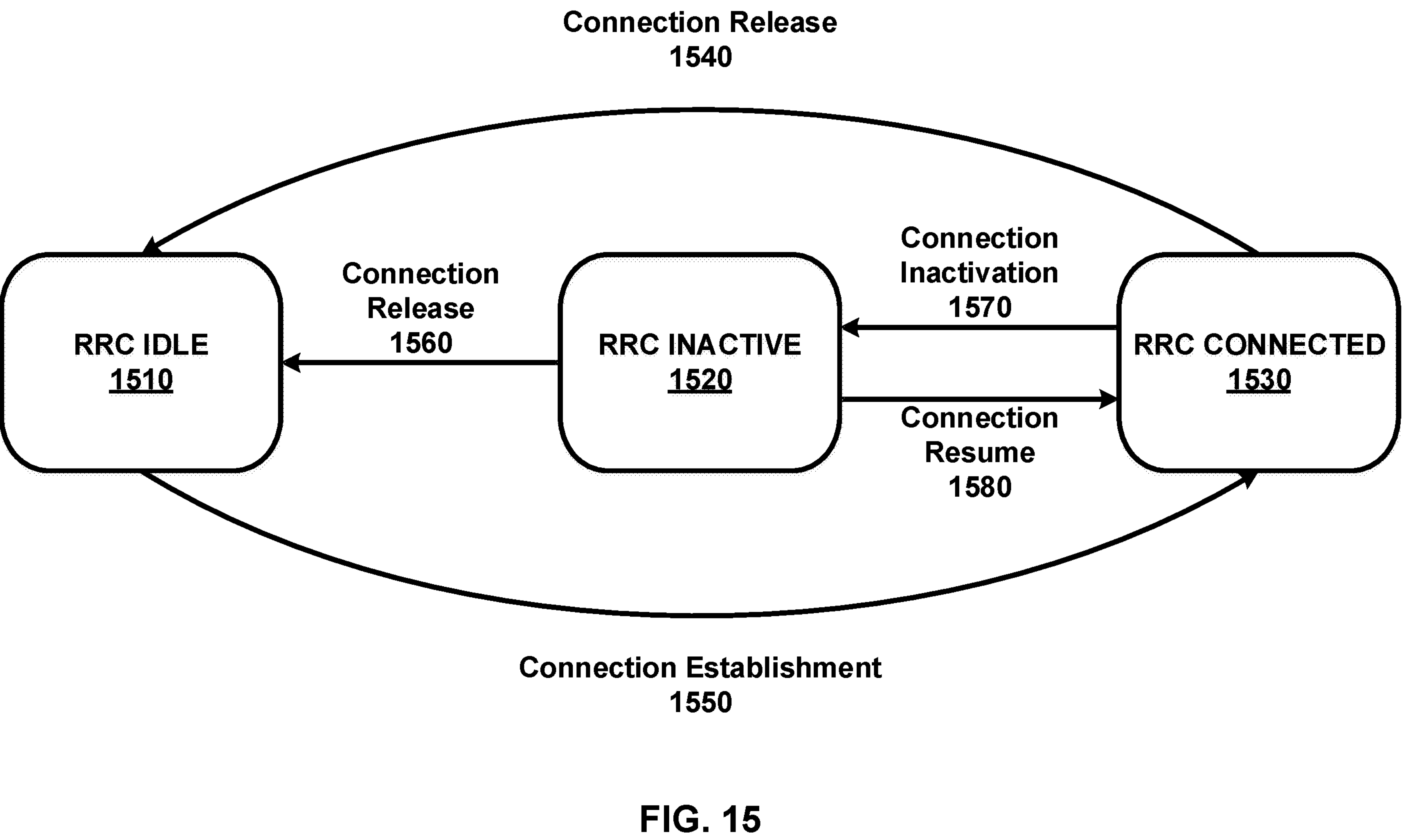
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A wireless device may be configured with one or more uplink (UL) bandwidth parts (UL BWPs) for a cell one or more of which may be activated for the cell. A BWP to support device-to-device (D2D) or to support sidelink (SL) between wireless devices may be configured and/or activated for the cell. For example, a BWP for D2D and/or a SL may be activated at the same time (or substantially the same time) that one or more of the UL BWP are activated. If a wireless device is activated with an UL BWP and a sidelink (SL) BWP for a cell, the wireless device may determine (e.g., may be required) to switch between the UL BWP and the SL BWP. The wireless device may determine to switch between the UL BWP and the SL BWP, for example, if a first numerology of the UL BWP and a second numerology of the SL BWP are different and the wireless device does not support more than one numerology for a UL carrier at a time. Service interruptions (e.g., not receiving any data/control and/or sending/transmitting any data/control) may occur, for example, if the wireless device performs a switching operation between UL BWP and SL BWP (e.g., a service interruption may occur during the switching). A service interruption of SL operation (e.g., not receiving any SL data/control and/or sending/transmitting any SL data/control) may occur, for example, if the wireless device performs an UL BWP switching operation. A wireless device may be unable to receive SL communications during the time period that the wireless device performs BWP switching.

A reception gap may comprise a time period during which no BWP switching occurs. A base station may determine a SL reception gap for a wireless device to use SL communications. The base station may indicate/inform one or more SL wireless devices of the SL reception gap via at least one RRC, MAC, and/or DCI message. A SL wireless device may determine that there is no BWP switching (e.g., the base station will not cause and/or trigger BWP switching for a wireless device) in one or more resources configured in the SL reception gap. Based on the SL reception gap, the SL wireless device may ignore a (or any) BWP switching command/timer (e.g., bwpInactivityTimer) that may impact one or more resources configured in the SL reception gap. A second SL-sending (e.g., transmitting) wireless device from the one or more second SL-sending (e.g., transmitting) wireless devices may select one or more SL-resources from the one or more resources configured in the SL reception gap.

Wireless devices may communicate with each other directly via wireless communications, for example, device-to-device communications, vehicle-to-everything communications, vehicle-to-vehicle communications, vehicle-to-network communications, vehicle-to-roadside infrastructure communications, vehicle-to-pedestrian communications, and/or direct communications, with or without involving a base station as an intermediary. Wireless devices may exchange data without passing the data through a base station in a wireless communications scheme, for example, a direct wireless device-to-wireless device (e.g., UE-to-UE) communication scheme. Communications between wireless devices that establish a direct communication link (e.g., a sidelink) between each other may have reduced latency and/or may utilize fewer radio resources compared to communications established via a central base station.

Figures 16A, 16B, 16C, 16D:
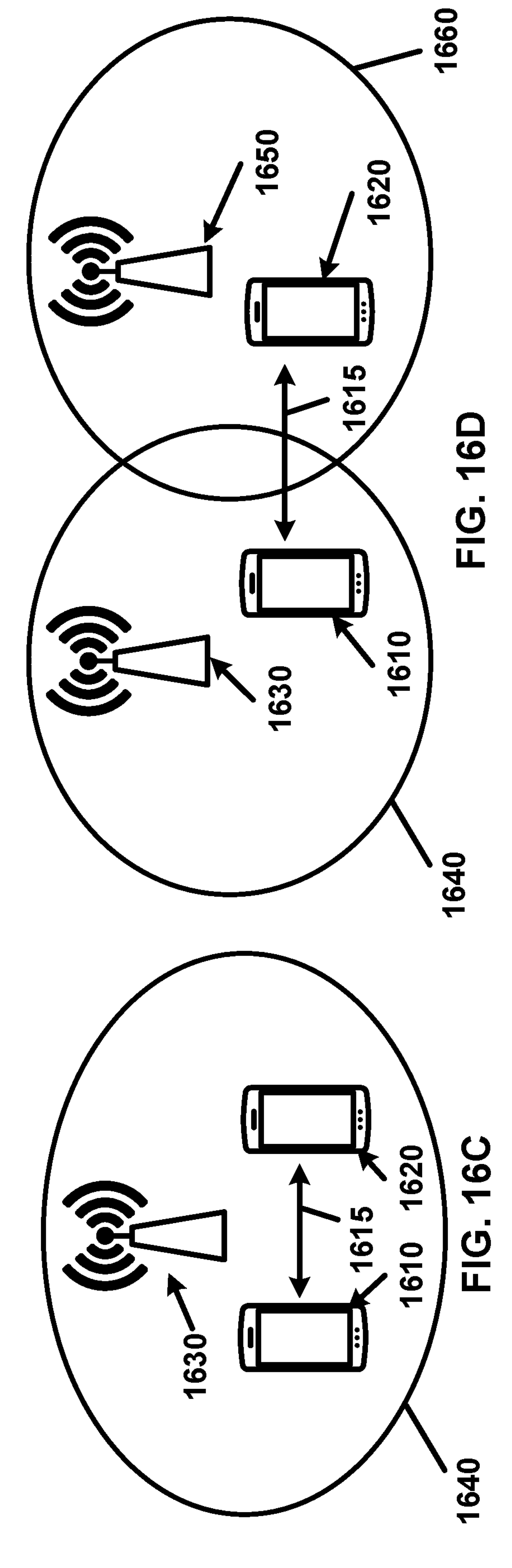
FIG. 16A shows an example of wireless communications between wireless devices without access to a base station of a wireless network.
FIG. 16B shows an example of wireless communications between wireless devices with one wireless device having access to a base station of a wireless network.
FIG. 16C shows an example of intra-cell wireless communications between wireless devices having access to a same base station of a wireless network.
FIG. 16D shows an example of inter-cell wireless communications between wireless devices having accesses to different base stations of a wireless network.

FIGS. 16A-16D show examples of wireless communications between wireless devices 1610 and 1620. Referring to FIG. 16A, wireless device 1610 and wireless device 1620 may perform wireless communications 1615 while located outside of range of a wireless network cell coverage provided by, for example, a base station or TRP. Referring to FIG. 16B, wireless device 1610 and wireless device 1620 may perform wireless communications 1615 while the wireless device 1610 is located within range of a wireless network cell coverage 1640 provided by, for example, a base station or TRP 1630, and the wireless device 1620 is located outside of range of the wireless network cell coverage 1640. Referring to FIG. 16C, wireless device 1610 and wireless device 1620 may perform intra-cell wireless communications 1615 while located within range of the same wireless network cell coverage 1640 provided by, for example, a base station or TRP 1630. Referring to FIG. 16D, wireless device 1610 and wireless device 1620 may perform inter-cell wireless communications 1615 while the wireless device 1610 is located within a first wireless network cell coverage 1640 provided by, for example, a first base station or TRP 1630, and the wireless device 1620 is located within a second wireless network cell coverage 1660 provided by, for example, a second base station or TRP 1650.

A wireless device (e.g., the wireless device 1610, 1620) may send (e.g., transmit) a wireless communications signal via a sidelink to perform one or more of discovery or communications. The wireless device 1610, 1620 may send the wireless communications signal to discover (e.g., determine) at least one other wireless device 1620, 1610 adjacent (e.g., closer than a base station 1630, 1650) to the wireless device 1610, 1620. The wireless device 1610, 1620 may send (e.g., transmit) and/or receive a wireless communications signal via a physical sidelink discovery channel (PSDCH) to perform discovery of one or more other wireless devices. The wireless device 1610, 1620 may send (e.g., transmit) the wireless communications signal to send general data (e.g., voice data, image data, video data, safety information, etc.) directly to at least one other wireless device 1620, 1610. A physical sidelink broadcast channel (PSBCH), a physical sidelink shared channel (PSSCH), a physical sidelink control channel (PSCCH), or the like may send (e.g., transmitting) and/or receive a wireless communications signal between wireless devices.

Figure 17A:
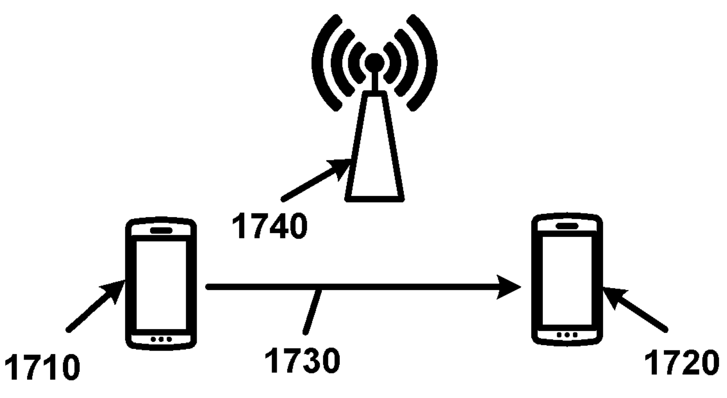
FIG. 17A shows an example of wireless communications between wireless devices having access to a base station of a wireless network.
Figure 17B:
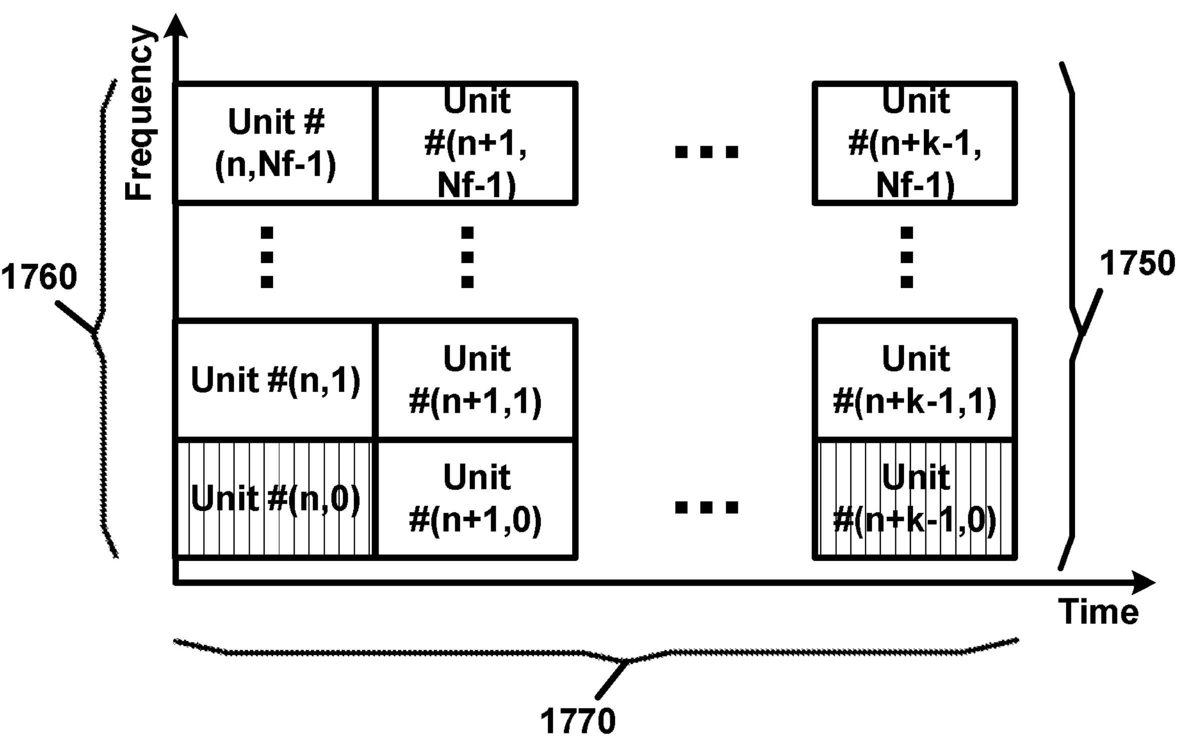
FIG. 17B shows an example of a resource pool for performing wireless communications.

FIG. 17A and FIG. 17B show examples of wireless communications. FIG. 17A shows an example of wireless communications between wireless devices having access to a base station of a wireless network. A wireless device 1710 may perform wireless communications with a wireless device 1720 by sending (e.g., transmitting) a wireless communications signal 1730 directly to the wireless device 1720. FIG. 17B shows an example of a resource pool 1750 for performing wireless communications. The resource pool 1750 may comprise radio resource units associated with the wireless devices 1710 and 1720 performing wireless communications. The wireless devices 1710 and 1720 may comprise a wireless terminal, access point (AP), or base station that sends (e.g., transmits) and/or receives a wireless signal for wireless communications. The wireless device 1710 may designate one or more radio resource unit(s) #(n . . . n+k−1, 0 . . . Nf−1) comprised by the resource pool 1750. The wireless device 1710 may send (e.g., transmit) the wireless communications signal 1730 based on or configured according to the designated one or more radio resource unit(s) #(n . . . n+k−1, 0 . . . Nf−1). The wireless device 1720 may receive a designation of one or more radio resource unit(s) #(n . . . n+k−1, 0 . . . Nf−1) comprised by the resource pool 1750 via which the wireless device 1710 may send (e.g., transmit) and the wireless device 1720 may receive the wireless communications signal 1730.

The base station 1740 may send (e.g., transmit) information regarding the resource pool 1750 to the wireless device 1710, for example, if the wireless device 1710 is located inside of a cell of network coverage provided by the base station 1740. The wireless device 1710 may receive the information regarding the resource pool 1750 from the wireless device 1720, for example, if the wireless device 1710 is located outside of a cell of network coverage provided by the base station 1740. The wireless device 1710 may access internally stored pre-configured information regarding the resource pool 1750, for example, if the wireless device 1710 is located outside of a cell of network coverage provided by any base station.

The resource pool 1750 may comprise a plurality of radio resource units #(n . . . n+k−1, 0 . . . Nf−1) indexed according to time slots (e.g., x axis) and frequency band slots (e.g., y axis). A radio resource unit may comprise one or more resource blocks (e.g., a frequency band slot, a subframe, K OFDM symbols) and a time duration. The wireless device 1710 may designate one or more radio resource unit(s) from a plurality of the radio resource units #(n . . . n+k−1, 0 . . . Nf−1) comprised by the resource pool 1750 and may send (e.g., transmit) a wireless communications signal 1730 according to the designated radio resource unit(s) for wireless communications with the wireless device 1720. A frequency band 1760 may be divided into a plurality of Nf frequency resource blocks. Each of the plurality of radio resource units #(n . . . n+k−1, 0 . . . Nf−1) may designate one (or more) of the Nf frequency resource blocks of the frequency band 1760. A time period 1770 may be divided into a plurality of k time resource blocks (e.g., time slot). Each of the plurality of radio resource units #(n . . . n+k−1, 0 . . . Nf−1) may designate one (or more) of the Nf frequency resource blocks of the frequency band 1760. The resource pool 1750 may be temporally repeated with a period of k time resource blocks. The resource pool 1750 may comprise a frequency band within a bandwidth part (BWP) for wireless communications or sidelink communications (e.g., a SL BWP). The given radio resource units #(n . . . n+k−1, 0 . . . Nf−1) may periodically and/or repeatedly appear over time. An index of a radio resource unit to which a logical resource unit is mapped may change with a predetermined pattern according to a value of time to generate a diversity gain in the time domain and/or the frequency domain. The resource pool 1750 may correspond to a set of radio resource units that the wireless devices 1710, 1720 may utilize for sending (e.g., transmitting) and/or receiving wireless communications signals 1730.

The resource pool 1750 may be classified according to contents of a wireless communications signal 1730 transmitted via the resource pool 1750. A plurality of wireless communications signals 1730 may be classified according to information content to be sent via the respective wireless communications signals 1730, and a separate resource pool 1750 may be allocated for each of the classifications of the wireless communications signals 1730. The resource pool 1750 may be allocated based on information content of the corresponding wireless communications signal 1730. The information contents of the wireless communications signal 1730 may include a control channel, a data channel, and/or a discovery channel. The control channel may correspond to a wireless communications signal 1730 that may comprise information indicating/specifying a radio resource position of a data channel, information indicating/specifying an MCS for modulating and demodulating a data channel, information indicating/specifying a MIMO transmission scheme, information specifying packet priority, information indicating/specifying target coverage, information specifying QoS requirements, or the like. The control channel may be multiplexed with and sent (e.g., transmitted) on a same radio resource unit as a data channel. A control and data channel resource pool may correspond to a resource pool 1750 via which control information and data information are multiplexed and sent (e.g., transmitted). The control channel may comprise a physical sidelink control channel (PSCCH). The data channel may comprise a physical sidelink shared channel (PSSCH) corresponding to a resource pool 1750 via which the wireless device 1710 sends (e.g., transmits) user data to the wireless device 1720. A data channel excluding control information may be sent (e.g., transmitted) in a resource pool 1750 dedicated to the data channel, for example, if control information and data information are multiplexed in a same radio resource unit and sent (e.g., transmitted). The wireless devices 1710 and 1720 may send (e.g., transmit) control information in a designated resource unit of a control resource pool and data information in a data resource pool via the same resource elements (Res). The wireless device 1710 may send (e.g., transmit) one or more messages via a discovery channel corresponding to a resource pool 1750 dedicated to the discovery channel to facilitate neighboring wireless devices, for example, the wireless device 1720, to discover the wireless device 1710 sending (e.g., transmitting) information such as identification (ID) information pertaining to the wireless device 1710 and/or the like.

The resource pool 1750 may be classified according to QoS level and/or associated service. The base station 1740 may designate a priority level for each resource pool 1750. The resource pool 1750 may be configured differently for different associated services. A specific resource pool 1750 may be configured for use by only specific unicast or groupcast wireless devices. Different resource pools 1750 may be designated for different wireless communications signals 1730, for example, based on one or more transmission/reception attributes of the wireless communications signals 1730. Different resource pools 1750 may be designated for different wireless communications signals 1730, for example, regardless of whether or not information contents of the wireless communications signals 1730 are identical to each other.

Different instances of a same data channel or a same discovery signal/message may be associated with differently classified resource pools 1750. The resource pool 1750 may be classified according to contents of a data channel or a discovery signal/message based on a transmission timing determination scheme of a wireless communications signal 1730 (e.g., whether the wireless communications signal 1730 is sent (e.g., transmitted) at a time based on a time of receiving a synchronization reference signal, for example, at the time of receiving the synchronization reference signal or a different time based on the addition of a timing advance value). The resource pool 1750 may be classified according to contents of a data channel or a discovery signal/message based on a resource allocation scheme (e.g., whether a base station designates a transmission resource of an individual wireless communications signal 1730 or a wireless device designates the transmission resource of the individual wireless communications signal 1730 from a resource pool 1750). The resource pool 1750 may be classified according to contents of a data channel or a discovery signal/message based on a signal format of a wireless communications signal 1730 (e.g., a number of symbols occupied by a wireless communications signal 1730 in a subframe, or a number of subframes used for sending (e.g., transmitting) a wireless communications signal 1730). The resource pool 1750 may be classified according to contents of a data channel or a discovery signal/message based on signal strength from a base station (e.g., the base station 1740), transmit power level of a wireless device (e.g., wireless device 1710) sending (e.g., transmitting) the wireless communications signal 1730, and/or the like.

Transmission resource designation methods may be categorized as different modes and/or types. A base station (e.g., base station 1740) may designate (e.g., directly designate) a transmission resource to be used by a wireless device (e.g., the wireless device 1710) for sending (e.g., transmitting) a wireless communications signal using a mode 1. The base station (e.g., eNB, gNB, etc.) may send (e.g., transmit) DCI to schedule a transmission of a wireless communications signal 1730 according to mode 1. A wireless device (e.g., wireless device 1710) may directly designate a transmission resource from a pre-configured transmission resource region or resource pool 1750 or from a transmission resource region or resource pool 1750 designated by a base station (e.g., base station 1740) using a mode 2. A base station (e.g., base station 1740) may designate (e.g., directly designate) a transmission resource to be used by a wireless device (e.g., the wireless device 1710) for performing a Type 2 discovery. A wireless device (e.g., wireless device 1710) may designate (e.g., directly designate) a transmission resource from a pre-configured transmission resource region or resource pool 1750 or from a transmission resource region or resource pool 1750 designated by a base station (e.g., base station 1740) for performing a Type 1 discovery.

The wireless device 1710 and the wireless device 1720 may perform time synchronization and/or frequency synchronization with one another, for example, to perform wireless communications with one another. The base station 1740 may synchronize the time and frequency references of the wireless devices 1710 and 1720 (e.g., by PSSs/SSSs of a cell provided by the base station 1740, other reference signals (e.g., CSI-RSs), and/or the like transmitted by the base station 1740), if the wireless devices 1710 and 1720 both are located within the network coverage of the cell. The wireless devices 1710 and 1720 may maintain time/frequency synchronization in a level that the wireless devices 1710 and 1720 are capable of directly sending (e.g., transmitting) and receiving a signal. The wireless device 1710 may send (e.g., transmit) a synchronization signal (e.g., a sidelink synchronization signal (SLSS)) and the wireless device 1720 may receive and synchronize with the synchronization signal. The SLSS may comprise a sidelink primary synchronization signal (S-PSS) and/or a sidelink secondary synchronization signal (S-SSS). The wireless device 1710 may send (e.g., transmit) the SLSS with a physical sidelink broadcast channel (PSBCH) to convey some basic or initial system information. The wireless devices 1710, 1720 may synchronize or derive a timing of transmission time intervals (e.g., frames, subframes, slots, and/or the like) using global navigation satellite system (GNSS) timing. S-PSS, S-SSS and PSBCH may be structured in a block format (e.g., sidelink synchronization signal block (S-SSB)) and may support periodic transmission. The S-SSB may use a same numerology (e.g., SCS and CP length) as a sidelink data channel and a sidelink control channel in a carrier. The S-SSB's transmission bandwidth may be within the pre-configured sidelink BWP. The S-SSB's frequency location may be pre-configured. The wireless device (e.g., the wireless device 1710) may forego performing hypothesis detection in frequency to find S-SSB in a carrier, if the S-SSB's frequency location is pre-configured. Sidelink synchronization sources may include GNSS, gNB, eNB, and/or NR UE. Each sidelink synchronization source may be associated with a synchronization priority level A priority order of the sidelink synchronization sources and/or synchronization priority levels may be pre-configured.

Each of a plurality of neighboring wireless devices 1710, 1720 may designate one or more subchannels of a resource pool 1750 for sending (e.g., transmitting) a wireless communications signal 1730. A frequency bandwidth of the resource pool 1750 may be divided into multiple subchannels. A wireless device 1710, 1720 may designate a subchannel, for example, based on received energy measurements and/or control channel decoding. A wireless device 1710, 1720 may determine a subchannel that another wireless device 1710, 1720 is designating for use, for example, based on control channel decoding and/or an energy measurement for each subchannel. In-band emissions (IBEs) may effectively impose a limit on system performance. An in-band emission may comprise interference caused by one transmitter transmitting on one subchannel and imposed on another transmitter transmitting to a receiver on another subchannel.

Figure 18:
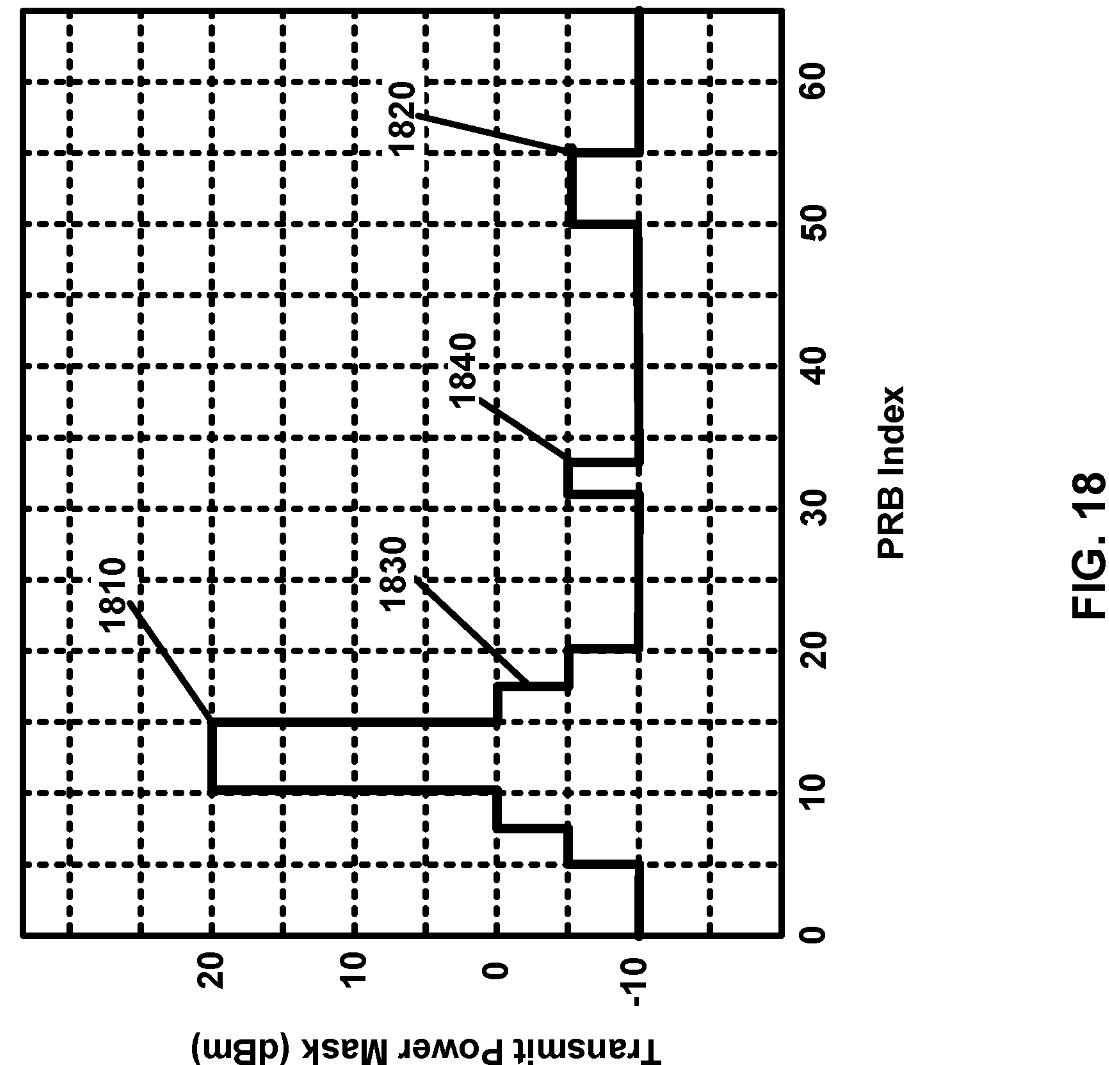
FIG. 18 shows an example of an in-band emissions (IBE) model.

FIG. 18 shows an example of an in-band emissions (IBE) model. Subchannels nearby to a desired transmitted signal 1810, as well as other subchannels (e.g., I/Q image subchannels 1820) may experience more interference, as shown in FIG. 18. General in-band emissions 1830 tend to be stronger close in frequency to the desired transmitted signal 1810. Carrier leakage 1840 tends to be generated around a direct current or direct conversion (DC) subcarrier. The I/Q image subchannels 1820 may be located in symmetrical subchannels of the desired transmitted signal around the DC subcarrier.

A wireless device 1710 radiating power in association with performing wireless communications within a cell of a wireless network provided by a base station 1740 may cause serious interference to the cellular communications of the cell. If the wireless device 1710 performing wireless communications uses only some frequency resources in a particular slot or subframe, the in-band emission of the power radiated by the wireless device 1710 may cause serious interference to the frequency resources used by the cellular communications network. The wireless device 1710 performing wireless communications may perform cellular pathloss-based power control to prevent excess interference that causes these problems. The base station 1740 may configure parameters used for power control (e.g., P0 or alpha).

A wireless device 1710 that sends (e.g., transmits) a wireless communications signal 1730 may correspond to a half-duplex wireless device, which may not be capable of receiving a signal at a same time of sending a signal (e.g., performing transmission). The wireless device 1710 may fail to receive a signal sent (e.g., transmitted) by another wireless device 1720 due to the half-duplex problem. Different wireless devices 1710, 1720 performing wireless communications may send (e.g., transmit) signals via one or more different time resources to mitigate the half-duplex problem.

Direct wireless communications between wireless devices in proximity to each other (e.g., closer to each other than the wireless devices are to a base station or sufficiently close to each other for the wireless devices to establish a reliable communication link with each other) may have various advantages. For example, the wireless devices participating in direct wireless communications with each other may have a high data transfer rate with low latency for data communications. Wireless devices performing wireless communications between each other in a wireless network cell may reduce network traffic concentration on a base station of the cell, for example, by distributing network traffic among direct connections between wireless devices in the cell. A wireless device, in a cell of a wireless network, performing wireless communications with another wireless device outside the cell, may perform a communications relay role and thereby effectively extend the communications reach and/or cell coverage of a base station that provides the cell's network communications.

Figure 19:
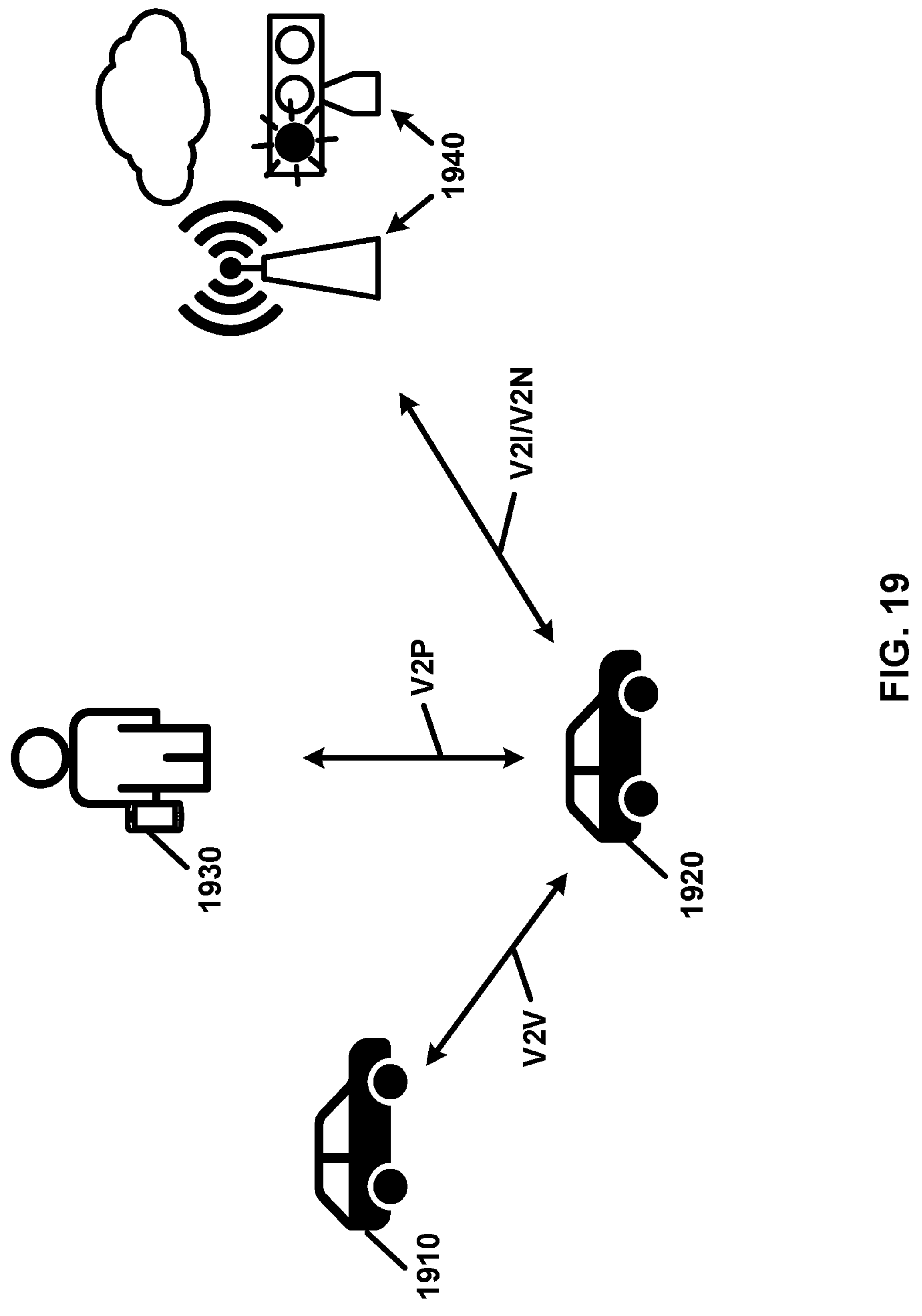
FIG. 19 is shows an example of wireless communications between various vehicles and wireless devices.

FIG. 19 shows an example of wireless communications between various vehicles and wireless devices. At least one automotive vehicle 1910, 1920 may apply the wireless communications methods described herein for sending and/or receiving communications signals and messages to and/or from an automotive vehicle (e.g., vehicle-to-everything (V2X) communications). V2X communications may include wireless communications between a vehicle and another vehicle, for example, vehicle-to-vehicle (V2V) wireless communications. V2X communications may include wireless communications between a vehicle and a portable wireless device 1930 carried by an individual (e.g., handheld wireless terminal carried by a pedestrian, cyclist, driver, or passenger), for example, vehicle-to-pedestrian (V2P) wireless communications. V2X communications may include wireless communications between a vehicle and an infrastructure/network and/or roadside unit (RSU)/network 1940 (e.g., traffic light and/or signal), for example, vehicle-to-infrastructure/network (V2I/N) wireless communications. An RSU 1940 may include a transportation infrastructure entity implemented in a base station or a stationary wireless device proximate a road or highway. The RSU may comprise, for example, an entity sending (e.g., transmitting) speed notifications to vehicles and/or wireless devices in the vicinity of a road or highway. A vehicle, an RSU, a stationary wireless device, and/or a portable wireless device may comprise a transceiver configured to perform V2X communications.

A vehicle 1910, 1920, a portable wireless device 1930, and/or an RSU 1940 may perform V2X communications to indicate warnings for various safety-related events and the like. The vehicle 1910 may perform V2X communications to send information regarding an event occurring on the vehicle 1910 or road via which the vehicle 1910 is traveling to another vehicle 1920, the RSU 1940, and/or a pedestrian's portable wireless device 1930. The information regarding the event may comprise a warning of a traffic accident on the road, a change of a road situation, and/or occurrence of an accident involving the vehicle 1910. The vehicle 1910 may perform V2X communications to send information regarding the event to a pedestrian adjacent to or crossing a road via the pedestrian's portable wireless device 1930, for example, as the vehicle 1910 approaches the pedestrian.

At least one vehicle 1910, 1920, portable wireless device 1930, and/or RSU 1940 may be configured for performing V2X communications, for example, to prevent and/or reduce vehicle collisions and/or improve communications quality of service in geographic locations having a high density of wireless devices 1930, for example, in city downtowns. At least one vehicle 1910, 1920, portable wireless device 1930, and/or RSU 1940 may be configured for performing wireless congestion control, for example, in conjunction with V2X communications, to mitigate collisions by adjusting one or more communications parameters to control a congestion level on the wireless channel(s) used by the at least one vehicle 1910, 1920 and improve reliability of V2X communications.

In some types of wireless communications, a wireless device may measure a channel busy ratio (CBR) and/or a channel occupancy ratio (CR). The wireless device may measure the CBR and/or CR, for example, to determine (e.g., characterize) the channel state, and/or allow/facilitate the wireless device to determine and/or take corrective actions. The CBR may be determined based on a portion (or quantity) of subchannels in a radio resource pool having measured RSSIs exceeding a threshold (e.g., a configured threshold, or a pre-configured threshold such as may be pre-configured by a base station). The total frequency resources of the radio resource pool may be divided into a quantity (e.g., a given number) of subchannels. The CBR may be sensed over, for example, the last 100 subframes (e.g., with subframes determined according to LTE or other standard or access technology), or any other duration or period (e.g., slots determined based on NR or any other access technology). The CBR may determine an estimate of a state of the channel. The CR may be determined at subframe n as a sum of the total number/quantity of subchannels used for sidelink transmissions in subframes ($[n-a, n-1]$ subchannels) and granted in subframes ($[n, n+b]$ subchannels), divided by a total number of subchannels ($[n-a, n+b]$ subchannels). Values for the variables a and b may be determined by the wireless device based on the conditions $a+b+1=1000$, $a \geq 500$. The CR may provide an indication of the channel utilization by the transmitter of the wireless device. A wireless device's CR limit, for each interval of CBR values, may represent a maximum footprint for the transmitter of the wireless device. A base station may establish the CR limit based on a CBR range and packet priority. The base station may establish a low CR limit, for example, if a high CBR is observed. The base station may establish a low CR limit, for example, based on a low packet priority level. The base station may map its CBR value to the correct interval to determine the corresponding CR limit value, for example, if transmitting a data packet. The wireless device may decrease its CR below the CR limit, for example, if the wireless device's CR is higher/greater than the CR limit. Various methods may be practiced to reduce the CR, for example. A base station may disable packet retransmission, for example, via a drop packet retransmission procedure. A base station may disable packet transmission and retransmission, for example, via a drop packet transmission procedure. A wireless device may reduce CR by augmenting the utilized MCS index, for example, via a procedure for adapting the MCS. The wireless device adapting the MCS may reduce the quantity of subchannels used for transmission. The wireless device increasing the MCS may reduce robustness of the message that the wireless device sends, and may consequently reduce a range of the message. A wireless device may reduce transmission power, for example, via a procedure for adapting the transmission power. The wireless device reducing transmission power may reduce overall CBR in the area, and may increase the value of the CR limit.

Some types of wireless communications may comprise mode 1 wireless devices and/or mode 2 wireless devices (and/or any other wireless devices). For mode 1 wireless devices, a base station may schedule SL resources to be used for SL communication (e.g., transmission). For mode 2 wireless devices, instead of the base station determining SL resources, the mode 2 wireless device may determine SL resources for SL communication (e.g., transmission). For example, instead of receiving updated resource scheduling information from a base station and using it for SL communication, the mode 2 wireless device may determine SL resources for SL communication based on previously configured SL communication types. A mode 2 wireless device may be unaware of if and/or when a mode 1 device or other device is unable to send and/or receive information (e.g., because the mode 2 device may have not received scheduling information from the base station). For example, the mode 2 device may not know and/or be able to determine if a mode 1 device is switching a BWP. Information sent (e.g., via SL) may fail to reach its intended destination, for example, if it is sent to a wireless device during a time at which the mode 1 wireless device is unable to receive information. If the information is not received, it may need to be sent again, causing additional power consumption, interference with other wireless signals, increasing latency, and/or decreasing reliability of communication. Similar problems may arise for mode 1 wireless devices, mode 2 wireless devices, and/or any other wireless device.

In wireless communications described herein, wireless devices (e.g., a mode 1 wireless device, a mode 2 wireless device, and/or any other wireless device), and/or a base station may determine one or more reception gaps (e.g., time periods) for sending information (e.g., no BWP switching and/or uplink/downlink scheduling will occur during the reception gap; or BWP switching and/or uplink/downlink scheduling has a reduced likelihood of occurring during the reception gap). Additionally or alternatively, the wireless devices and/or the base station may determine reception gaps during which information should not be sent (e.g., BWP switching and/or uplink/downlink scheduling may occur during the reception gap). The wireless devices and/or base station may send information to each other indicating the determined reception gaps (e.g., when the reception gaps will occur or when they are likely to occur). The wireless devices may communicate via SL based on the determined time periods (e.g., to allow SL communications to reach the intended recipient the first time they are sent). Coordinating SL communication may reduce power consumption of wireless devices, for example, by decreasing the number/quantity of times information needs to be sent. Coordinating SL communications may reduce interference with wireless signals and/or may reduce latency. Coordinating SL communication may increase reliability of wireless communications. Coordination may improve the ability for a wireless device to receive a communication the first time it is sent and/or reduce the likelihood and/or quantity of retransmissions. For example, a vehicle may receive safety information such as speed, location, and direction of another vehicle more quickly (e.g., the first time the information is sent and/or with fewer retransmissions) for wireless devices such as vehicle-to-anything (V2X) wireless devices. Wireless communications between any wireless devices (e.g., via a SL) for a variety of applications may be improved, as described further herein.

If a wireless device switches from one BWP to another BWP, there may be a switching period during which the wireless device may not be expected to send (e.g., transmit) and/or receive information (e.g., at least one message, transport block, data, control information, etc.). For example, the wireless device may be unable to send and/or receive information during switching of its active DL and/or UL from a BWP to another BWP.

For DCI-based BWP switching, after the wireless device (e.g., a mode 1 wireless device or a mode 2 wireless device) receives a BWP switching request at DL slot n via a serving cell, the wireless device may be able to receive PDSCH transmission (e.g., for DL active BWP switching). Additionally or alternatively, the wireless device may be able to send (e.g., transmit) PUSCH transmission (e.g., for UL active BWP switch) on or using the new BWP via the serving cell on which BWP switching (e.g., for the first DL or UL slot) occurs (e.g., after or immediately after the beginning of a DL slot and/or any associated delay (e.g., DLslot n+TBWPswitchDelay)). The wireless device may disregard one or more requirements (e.g., described herein), for example, if performing a DCI-based BWP switch between the BWPs in disjoint channel bandwidths and/or in partially overlapping channel bandwidths. For a timer-based BWP switching, the wireless device may start BWP switching at DL slot n, where n may be the beginning of a DL subframe (e.g., FR1) or DL half-subframe (e.g., FR2) after (e.g., immediately after) a BWP-inactivity timer (e.g., bwp-InactivityTimer) expires on a serving cell. The wireless device may be able to receive a PDSCH transmission (e.g., for DL active BWP switch) and/or send (e.g., transmit) a PUSCH transmission (e.g., for UL active BWP switching) on or using the new BWP via the serving cell. The serving cell may be the cell via which BWP switching on the first DL and/or UL slot occurs, for example, after (e.g., immediately/right) after the beginning of a DL slot and/or any associated delay (e.g., DL slot n+TBWPswitchDelay).

The wireless device may not be required to send (e.g., transmit) UL signals and/or receive DL signals, for example, during a time duration (e.g., during TBWPswitchDelay) via the cell on which a DCI-based BWP switching and/or timer-based BWP switching occurs. The wireless device may finish a BWP switching within the time duration (e.g., TBWPswitchDelay), for example, based on wireless device capability.

Figure 20A:
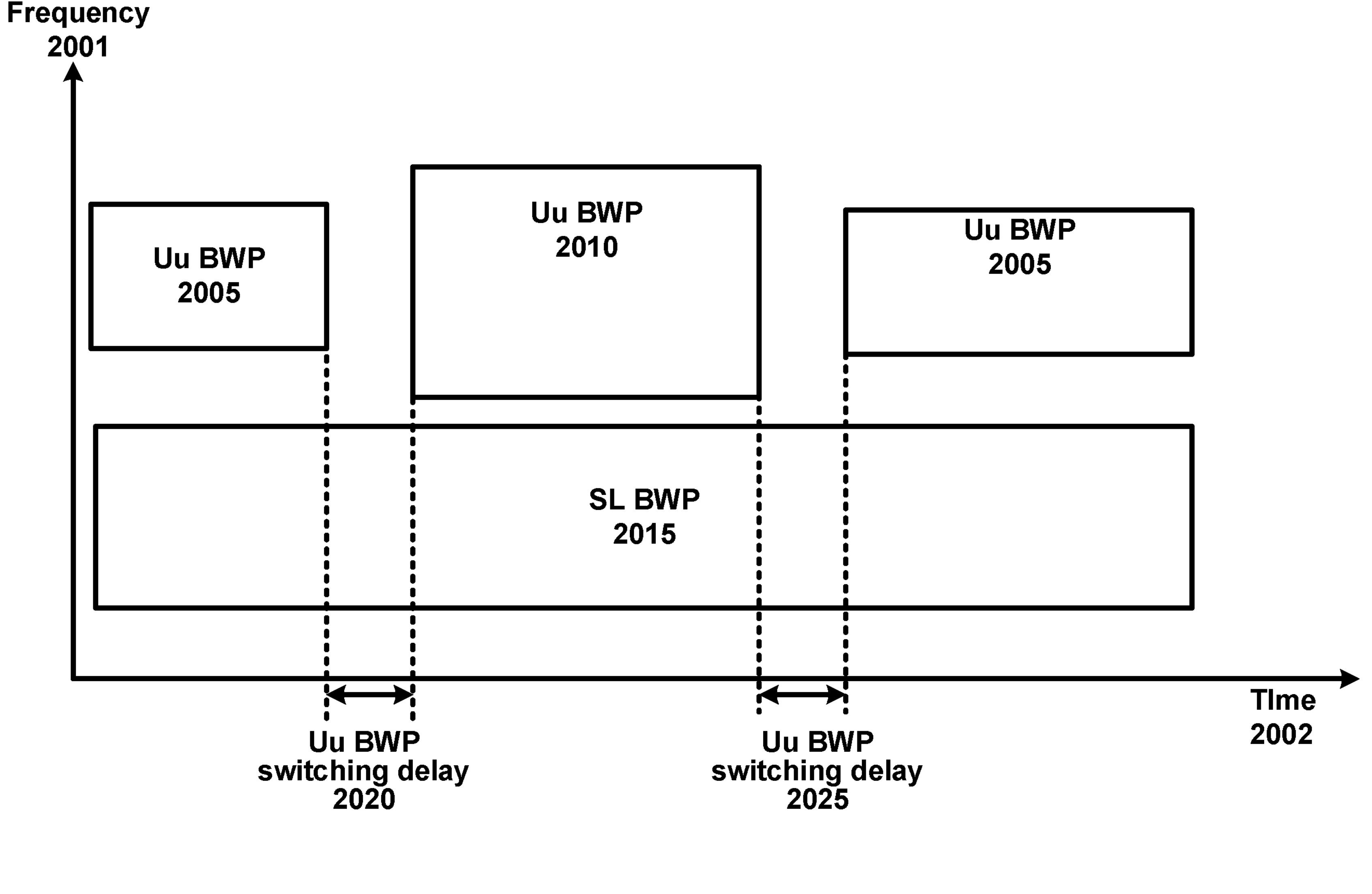
FIG. 20A and FIG. 20B show example bandwidth part (BWP) configurations.
Figure 20B:
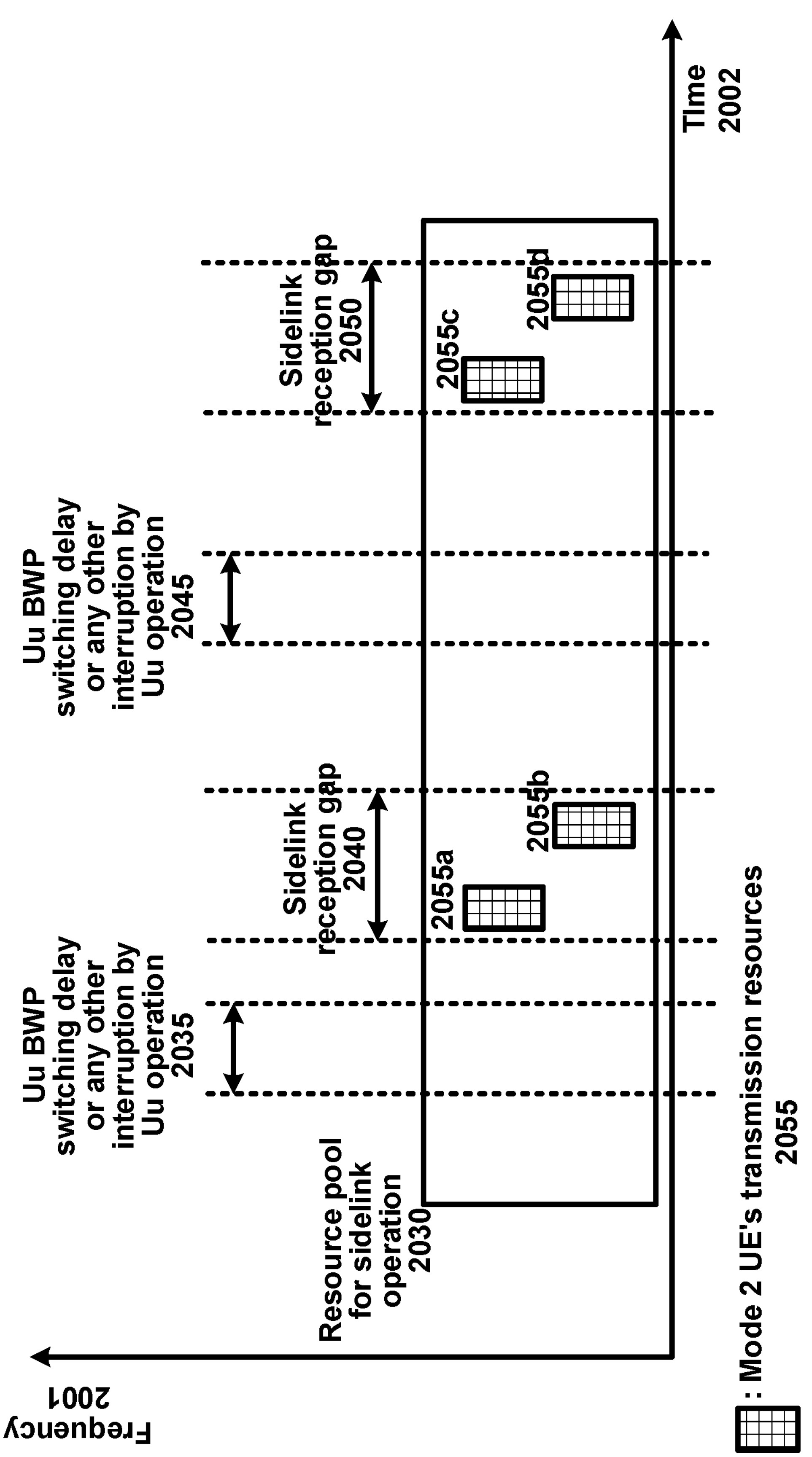

FIGS. 20A-20B show example BWP configurations. The BWP configurations may be over time 2002 and/or frequency 2001. A SL BWP 2015 (in FIG. 20A) and/or a resource pool for sidelink operation 2030 (in FIG. 20B) may be configured to support wireless communications with devices outside the coverage of a cell (e.g., between two devices that are outside of the coverage) and/or within partial coverage of a cell (e.g., between one device that is outside the coverage and one device that is within the coverage of the cell) and/or inside the coverage of a cell (e.g., between two devices that inside of the coverage). The resource pool for sidelink operation 2030 may be a resource pool that is selected by a mode 2 wireless device. A wireless device outside the coverage (out of coverage wireless device) may be unable to communicate, via SL, with an in-coverage wireless device, for example, if the in-coverage wireless device switches the SL BWP 2015 and/or resources used in resource pool 2030. For example, the out-of-coverage wireless device may not know and/or may not be able to determine the BWP switching information of the in-coverage wireless device (e.g., the BWP that the in-coverage wireless device switched to for SL communication) and/or may be unable to determine the correct BWP for SL communication. To avoid this problem, SL BWP 2015 and/or resource pool 2030 may remain unchanged and/or devices may avoid signaling activate/deactivate messages via a SL and/or via a DL. Switching Uu (e.g., downlink or uplink) BWP may cause an interruption of SL communication. For example, a mode 1 wireless device (e.g., an in-coverage wireless device as described herein, and/or a mode 1 wireless device 2103 as described in connection with FIGS. 21-24) may receive information from a base station that may cause the mode 1 wireless device (or other wireless device) to switch from Uu BWP 2005 to Uu BWP 2010. A Uu BWP switching delay and/or reception gap 2020, and/or other interruption 2035 may be the time period during which the mode 1 wireless device (or other wireless device) switches from Uu BWP 2005 to Uu BWP 2010. The mode 1 wireless device may be unable to send and/or receive information, for example, during the Uu switching delay 2020 (and/or other interruption 2035). The mode 1 wireless device may be unable to send or receive information, for example, during a Uu BWP switching delay and/or reception gap 2025 (e.g., the time during which the mode 1 device switches back from the Uu BWP 2010 to the Uu BWP 2005) or for example, during the interruption 2045. The mode 1 device may not receive the communication, for example, if an out-of-coverage device or mode 2 wireless device (e.g., the mode 2 wireless device 2102 discussed below in connection with FIGS. 21-27) sends a SL communication to the mode 1 wireless device during the delay 2020 or delay 2025. As a result, the mode 2 wireless device may need to resend the communication.

A mode 1 wireless device's communication (e.g., transmission) resources may be scheduled by a base station (e.g., gNB, eNB, or any other base station) so that BWP switching does not occur, for example, when a mode 2 wireless device communicates, via SL, with the mode 1 wireless device. For mode 1 wireless devices, communication (e.g., transmission) resources may be controlled by a base station. A lack of assistance/control for reception resources for mode 1 wireless devices may cause problems with SL communication and/or other problems. To solve these problems, a base station may help the resource selection of the mode 2 wireless device. Additionally or alternatively, a base station may assist the reception operation of the mode 1 wireless device.

To mitigate the SL operation interruption, a base station (e.g., gNB, eNB, or any other base station) may notify mode 2 wireless devices (or other wireless devices) of a reception gap (e.g., SL reception gap 2040 and/or SL reception gap 2050). The reception gap may be the time period during which BWP or other resource switching may occur (e.g., may potentially occur) (e.g., SL communication should not occur during this period). For example, a resource may be switched from resource 2055*a* to resource 2055*b* in SL reception gap 2040 (and/or from resource 2055*c* to resource 2055*d* in SL reception gap 2050). Alternatively, the reception gap may be a time period during which BWP or other resource switching may not and/or does not occur (e.g., SL communication should be made during this period). The mode 1 wireless device's (or other wireless device's) SL reception gap information may be sent (e.g., signaled) via an RRC message and/or via a SIB message to mode 2 wireless devices. The SL reception gap information may indicate a specific time interval for allowing reception of a wireless communication (e.g., SL, D2D, etc.) signal. The SL reception gap information may comprise, for example, an offset, time interval (e.g., a number of symbols, slots, subframes, and/or frames), bitmap, and/or periodicity. The offset may comprise a symbol, slot, subframe, and/or frame offset. For example, the offset may be with respect to system frame number 0 and/or a slot receiving DCI, MAC CE, and/or RRC message conveying, for example, the SL reception gap information. A bitmap may comprise a symbol level, slot level, subframe level, and/or frame level bitmap. Each bit in a bitmap may, for example, indicate a symbol, slot, subframe, and/or frame. The gap information may assist and/or coordinate SL (e.g., it may indicate reception for mode 1 wireless devices and/or transmission for mode 2 wireless devices or other wireless devices) communication (e.g., operation). A mode 2 wireless device (or other wireless device) may determine its communication (e.g., transmission) resource(s) for sending information to a mode 1 wireless device (or other wireless device), for example, based on the gap information. A wireless device may select one resource pool for communication (e.g., transmission), for example, if multiple resource pools are allowed for SL communication. The wireless device may notify a mode 2 wireless device (or other wireless device) of the selection. The mode 2 wireless device (or other wireless device) may select communication (e.g., transmission) resources (e.g., resources 2055*a-d*) that are overlapped (e.g., that are both in the selected resource pool and in the SL reception gap information).

Figure 21:
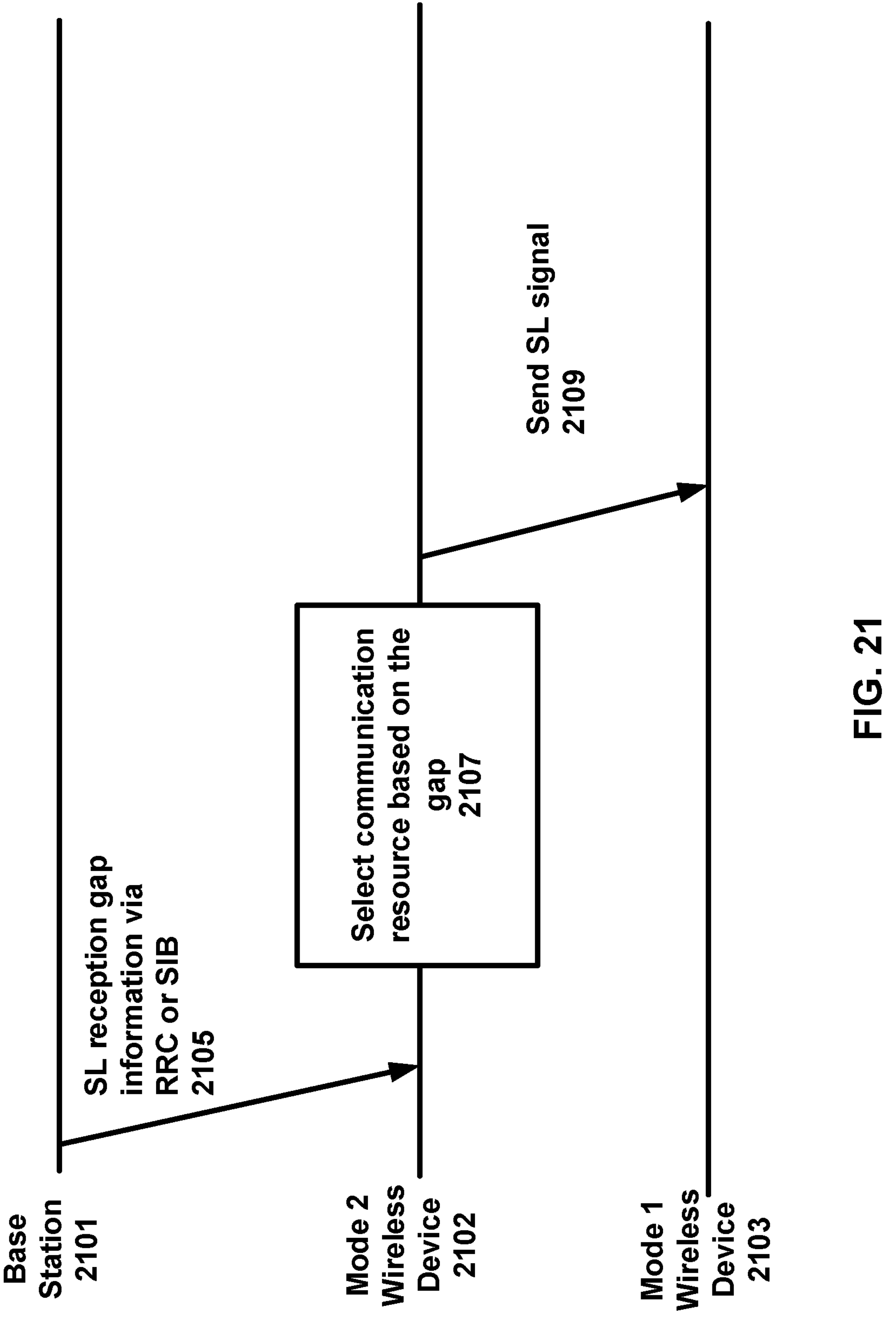
FIG. 21 shows an example method for coordinating BWP switching.

FIG. 21 shows an example method for coordinating BWP switching. A base station 2101 may coordinate communications between a mode 2 wireless device 2102 (or other wireless device) and a mode 1 wireless device 2103 (or other wireless device) by sending information to the mode 2 wireless device 2102. Although one or more steps of the example method of FIG. 21 are described for convenience as being performed by the base station 2101, the mode 2 wireless device 2102, and/or the mode 1 wireless device 2103, one, some, or all of such steps may be performed by one or more other devices (e.g., a base station, a wireless device, a core network device, etc.), and/or steps may be distributed among one or more devices, including any device described in connection with FIGS. 1-20. One or more steps of the example method of FIG. 21 may be rearranged, modified, repeated, and/or omitted.

At step 2105, the base station 2105 may send SL reception gap information to the mode 2 wireless device 2102 (or other wireless device). For example, the base station 2105 may send the information via a radio resource control (RRC) and/or via a system information block (SIB) message. The reception gap information may allow the mode 2 wireless device 2102 to configure SL communications, for example, based on the reception gap of the mode 1 wireless device 2103. Although only one mode 2 wireless device is shown in FIG. 21, the base station 2101 may send the reception gap information to any number of mode 2 wireless devices (or other wireless devices). Each wireless device that receives the reception gap information may use it to select communication resources as described below in step 2107 (e.g., each mode 2 wireless device may use the same resources for SL communication). At step 2107, the mode 2 wireless device 2102 (or other wireless device) may determine the resources of the signal to be sent (e.g., transmitted) to the mode 1 wireless device 2103 (or other wireless device), for example, based on the reception gap information received in step 2105. At step 2109, the mode 2 wireless device 2102 may send a SL signal to the mode 1 wireless device 2103 (e.g., using the resources determined in step 2107).

The mode 1 wireless device 2103 (or other wireless device) may select one or more reception gaps, for example, if multiple reception gaps are configured by the base station. The Mode 1 wireless device 2103 may determine which reception gap is selected and may send the selected gap information to the mode 2 wireless device 2102 (or other wireless device). For example, the selected gap information may be sent via a SL physical layer (e.g. PSCCH) and/or via a higher layer control signal (e.g. SL MAC or SL RRC). The mode 1 wireless device 2103 may send the reception gap information selected by the wireless device 2102 in step 2107 to the base station (e.g., using the physical layer or higher layer signal). The mode 2 wireless device 2102 may send a request to the mode 1 wireless device 2103. The request may indicate a gap of a specific pattern (e.g., SL communication pattern) followed by the mode 2 wireless device 2102. For example, the pattern may indicate whether and/or when to exchange physical layer and/or upper layer control signals in the process of exchanging information with each other. The mode 1 wireless device 2103 may send the pattern back to the base station 2101. Within a SL reception gap, the mode 1 wireless device 2103 may expect to not be interrupted by BWP switching, UL transmission, or any other cellular operation. The mode 1 wireless device 2103 may be able to receive SL signals without interruption during the reception gap.

Figure 22:
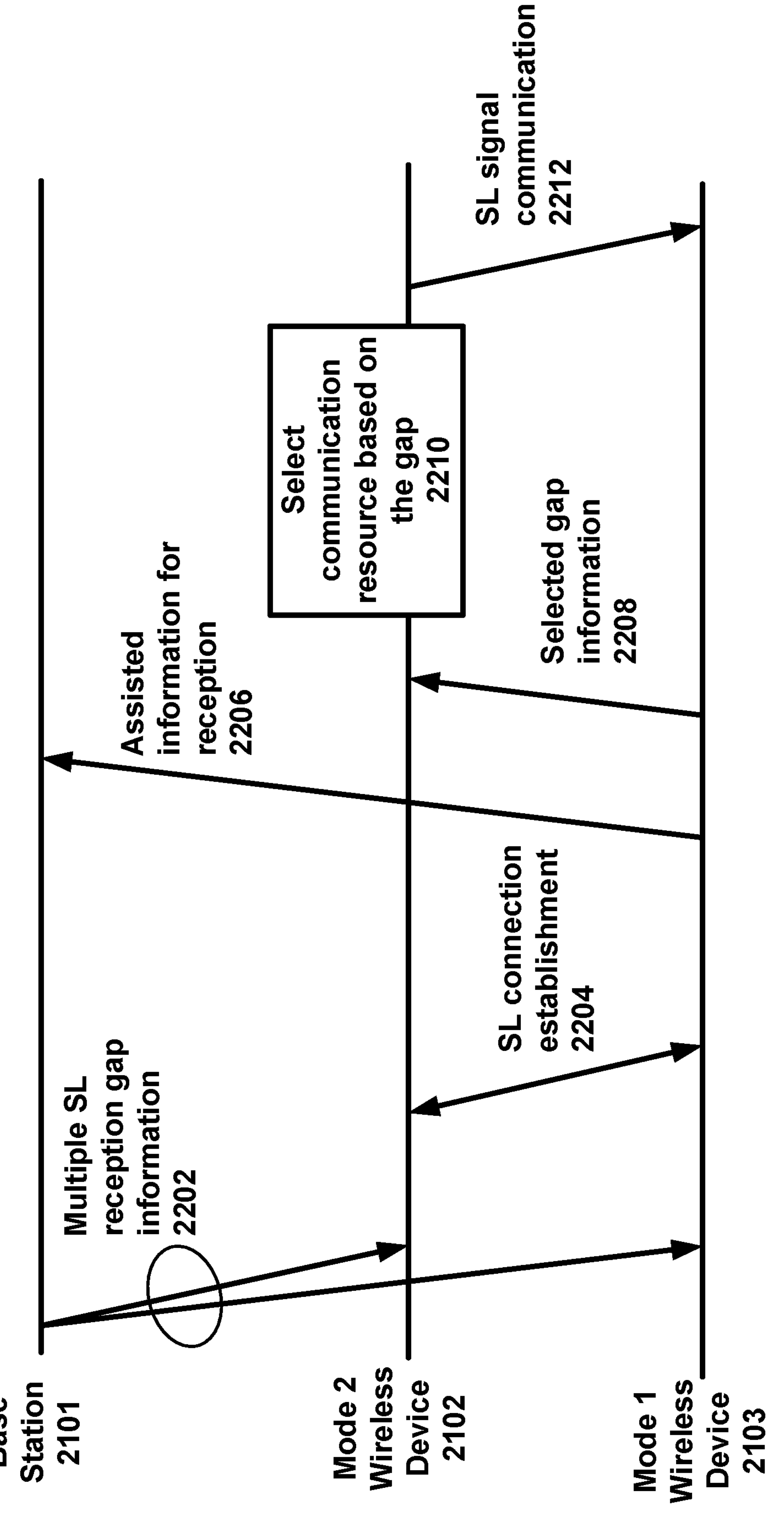
FIG. 22 shows an example method for coordinating BWP switching.

FIG. 22 shows an example method for coordinating BWP switching. The base station 2101 may coordinate communications between a mode 2 wireless device 2102 (or any other wireless device) and a mode 1 wireless device 2103 (or any other wireless device), for example, by sending information to both the mode 2 wireless device 2102 and the mode 1 wireless device 2103. The mode 1 wireless device may determine communication resources (e.g., for SL communication), for example, based on the information from the base station, and/or may notify the mode 2 wireless device of its determination. The mode 2 wireless device may determine a communication resource (e.g., for SL communication), for example, based on the information from the base station and the determination made by the mode 1 wireless device. Although one or more steps of the example method of FIG. 22 are described for convenience as being performed by the base station 2101, the mode 2 wireless device 2102, and/or the mode 1 wireless device 2103, one, some, or all of such steps may be performed by one or more other devices (e.g., a base station, a wireless device, a core network device, etc.), and/or steps may be distributed among one or more devices, including any devices such as those described in connection with FIGS. 1-20. One or more steps of the example method of FIG. 22 may be rearranged, modified, repeated, and/or omitted.

At step 2202, information indicating multiple reception gaps may be sent to the mode 2 wireless device 2102 and/or the mode 1 wireless device 2103. The reception gap information may be sent via the base station 2101. For example, the base station 2101 may configure a plurality of SL reception gaps and/or send them to the mode 2 wireless device 2102 and the mode 1 wireless device 2103. At step 2204, there may be a SL connection establishment between the mode 2 wireless device 2102 and the mode 1 wireless device 2103. For example, there may be an exchange of traffic information between the devices. The mode 1 wireless device 2103 may select one or more of the reception gaps. At step 2206, the assisted information for reception (e.g., the one or more reception gaps selected in step 2204) may be sent to the base station 2101. For example, the mode 1 wireless device may send its selection information (e.g., one or more reception gaps of the plurality of SL reception gaps it received in step 2202) to the base station 2101. At step 2208, the selected gap information may be sent (e.g., transmitted) to the mode 2 wireless device 2102. For example, the mode 1 wireless device 2103 may send the reception gap information selected in step 2204 to the device 2102 via a SL control (e.g., using PSCCH, SL MAC, and/or SL RRC).

At step 2210, the mode 2 wireless device 2102 may determine one or more transmission resources based on the gap information (e.g., the information received in step 2208). For example, the mode 2 wireless device 2102 may select one or more reception gaps that correspond to the gap information received in step 2208, for example, if multiple reception gaps are configured by the base station 2101. The mode 2 wireless device 2102 may send (e.g., transmit) its selected gap information to the mode 1 wireless device 2103 via a physical layer (e.g. PSCCH) and/or via a higher layer control signal (e.g. SL MAC or SL RRC). The mode 1 wireless device may report the gap information selected by the mode 2 wireless device to the base station 2101 (e.g., via RRC or MAC signaling). The base station 2101 may avoid triggering BWP switching within the selected gap. Additionally or alternatively, the mode 1 wireless device may ignore BWP switching commands received during the selected gap. For example, the wireless device may postpone an inactivity timer expiry (e.g., inactivityTimer expiry) (e.g., if BWP switching occurs due to the inactivity timer), ignore BWP switching DCI, and/or not receive (e.g., ignore) information via Uu.

Figure 23:
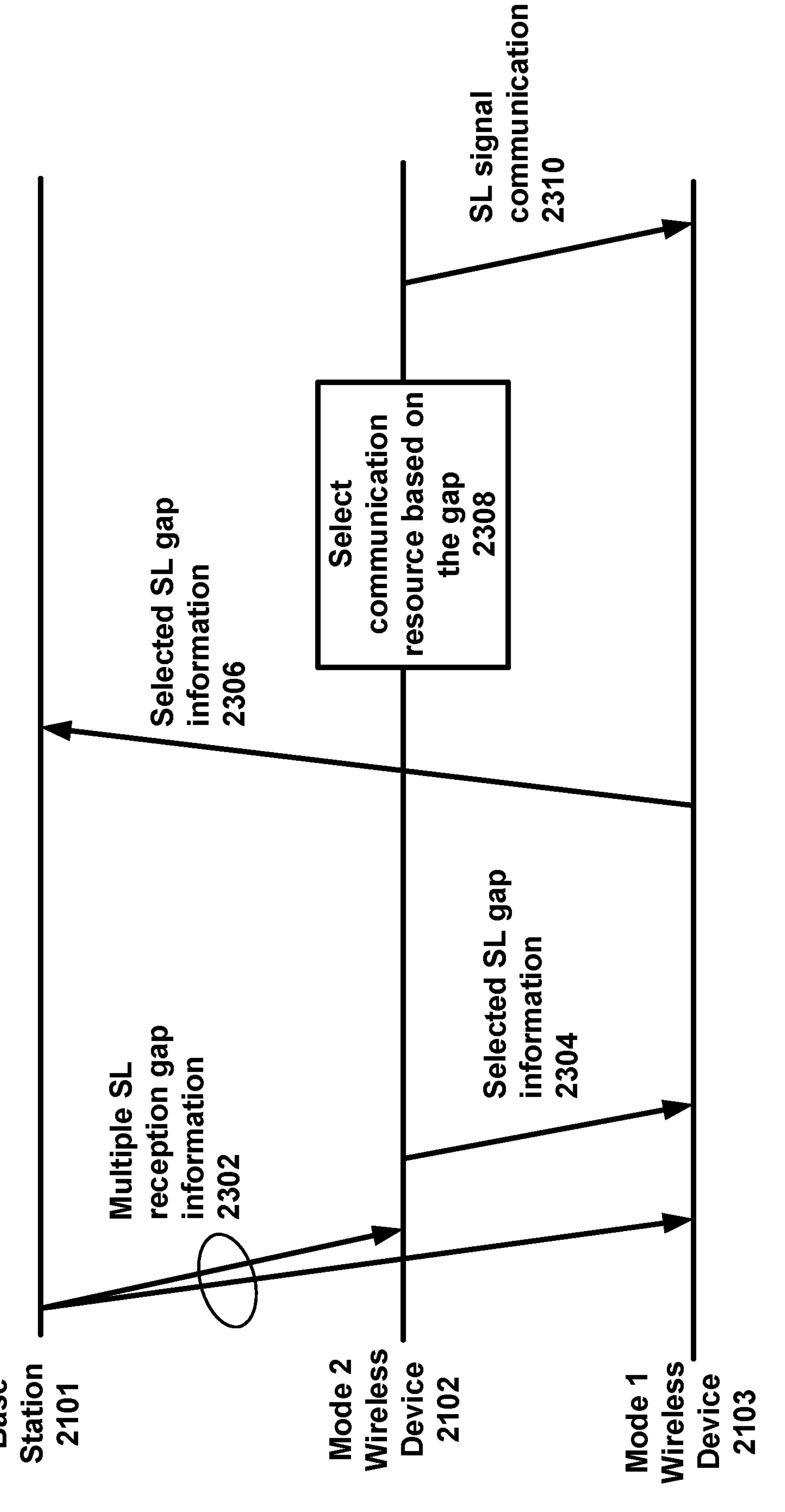
FIG. 23 shows an example method for coordinating BWP switching.

FIG. 23 shows an example method for coordinating BWP switching. The base station 2101 may coordinate communications between a mode 2 wireless device 2102 (or any other wireless device) and a mode 1 wireless device 2103 (or any other wireless device), for example, by sending information to both the mode 2 wireless device 2102 and the mode 1 wireless device 2103. The mode 2 wireless device 2102 may determine communication resources, for example, based on the information received from the base station 2101 and may notify the mode 1 wireless device 2103 of the determination. The mode 1 wireless device 2103 may send an indication of the determined resources to the base station 2101 (e.g., to ensure that the base station does not interfere with the mode 2 wireless device's 2102 determination of communication resources). Although one or more steps of the example method of FIG. 23 are described for convenience as being performed by the base station 2101, the mode 2 wireless device 2102, and/or the mode 1 wireless device 2103, one, some, or all of such steps may be performed by one or more other devices (e.g., a base station, a wireless device, a core network device, etc.), and/or steps may be distributed among one or more devices, including any devices such as those described in connection with FIGS. 1-20. One or more steps of the example method of FIG. 23 may be rearranged, modified, repeated, and/or omitted.

At step 2302, the base station 2101 may send a plurality of SL reception gaps to SL wireless devices (e.g., the mode 2 wireless device 2102 and/or the mode 1 wireless device 2103). The reception gaps may be sent via RRC and/or via SIB. At step 2304, the mode 2 wireless device 2102 may select one or more of the plurality of SL reception gaps (e.g., received in step 2302) for sending (e.g., transmission) to the mode 1 wireless device 2103. The mode 2 wireless device 2102 may send the selection of gaps to the mode 1 wireless device 2103 (e.g., via a PSCCH and/or via a higher layer signaling). At step 2306, the mode 1 wireless device may send the selected SL gap information (e.g., received in step 2304) to the base station. For example, the selected SL gap information may be sent via a physical layer and/or via a higher layer signaling. At step 2308, the mode 2 wireless device may determine the SL signal transmission resource using the information (e.g., based on the selected SL reception gap information determined in step 2304).

The direct current or direct conversion (DC) subcarrier of Uu BWP may be different from the BWP of SL. DC subcarriers may receive higher interference than other subcarriers. The wireless device may send (e.g., transmit) a signal to a base station (e.g., gNB, eNB, and/or any other base station) to indicate the DC subcarrier of the UL BWP. By indicating the DC subcarrier, the base station may puncture the information received on the subcarrier in a decoding process, which may improve the decoding performance.

Figure 24:
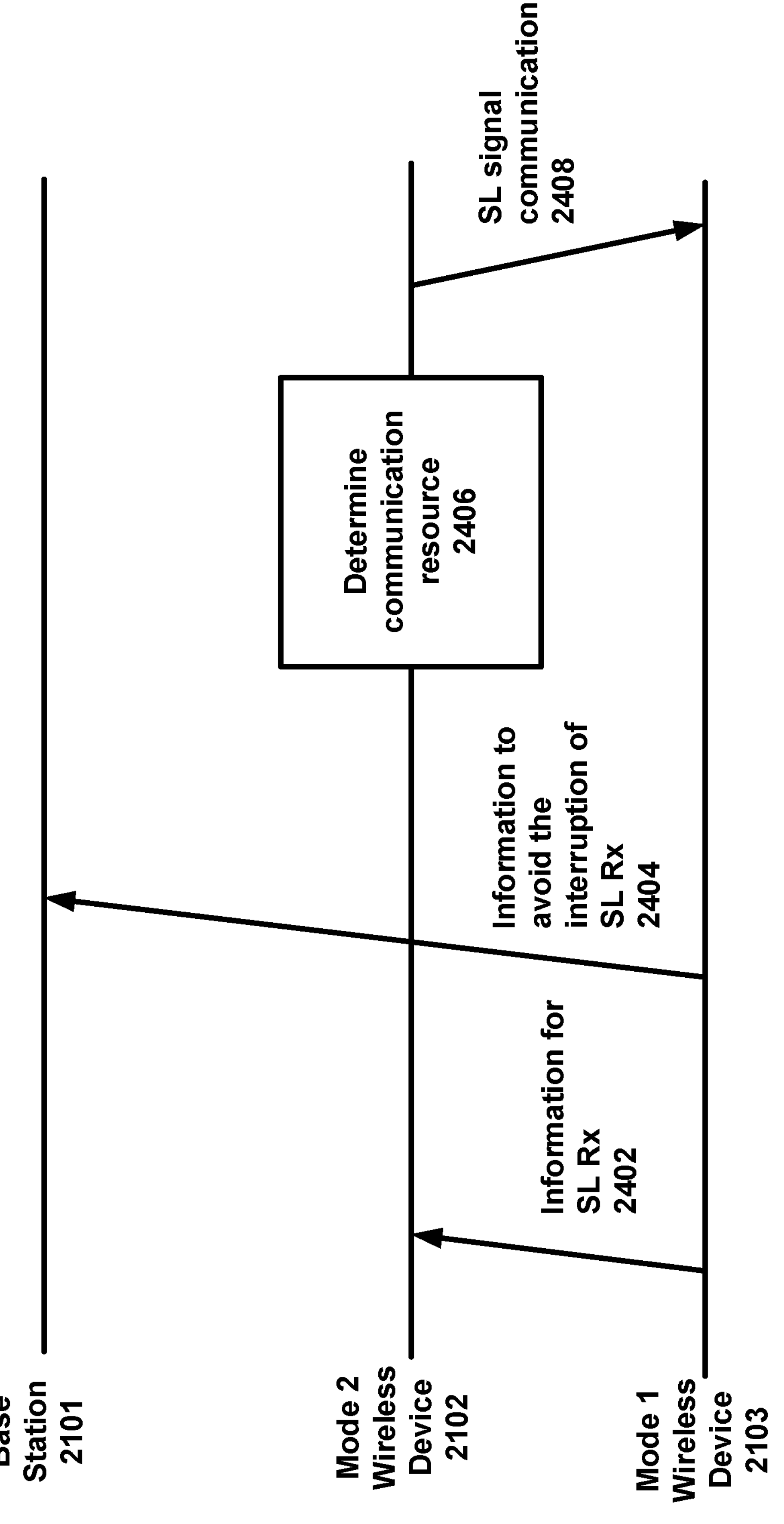
FIG. 24 shows an example method for coordinating BWP switching.

FIG. 24 shows an example method for coordinating BWP switching. The mode 1 wireless device 2103 (or any other wireless device) may communicate with the mode 2 wireless device 2102 (or any other wireless device) to coordinate BWP switching. The mode 1 wireless device 2103 may notify the base station 2101. Although one or more steps of the example method of FIG. 24 are described for convenience as being performed by the base station 2101, the mode 2 wireless device 2102, and/or the mode 1 wireless device 2103, one, some, or all of such steps may be performed by one or more other devices (e.g., a base station, a wireless device, a core network device, etc.), and/or steps may be distributed among one or more devices, including any devices such as those described in connection with FIGS. 1-20. One or more steps of the example method of FIG. 24 may be rearranged, modified, repeated, and/or omitted.

At step 2402, the mode 1 wireless device 2103 may send information for assisting SL Rx communications to the mode 2 wireless device 2102. For example, the information may be sent via SL signal (e.g. PSCCH, MAC or RRC). At step 2404, the mode 1 wireless device 2103 may send the information to the base station 2101. For example, the information may be sent to the base station 2101 via physical layer signaling (e.g., PUSCH and/or PUCCH) and/or via higher layer signaling (e.g. MAC or RRC). At step 2406, the mode 2 wireless device 2102 may determine its transmission resource, for example, based on the information received from the mode 1 wireless device in step 2402. At step 2408, the mode 2 wireless device 2102 may send a SL signal communication (e.g., transmission) to the mode 1 wireless device 2103 (e.g., using the communication resource determined in step 2406).

Figure 25A:
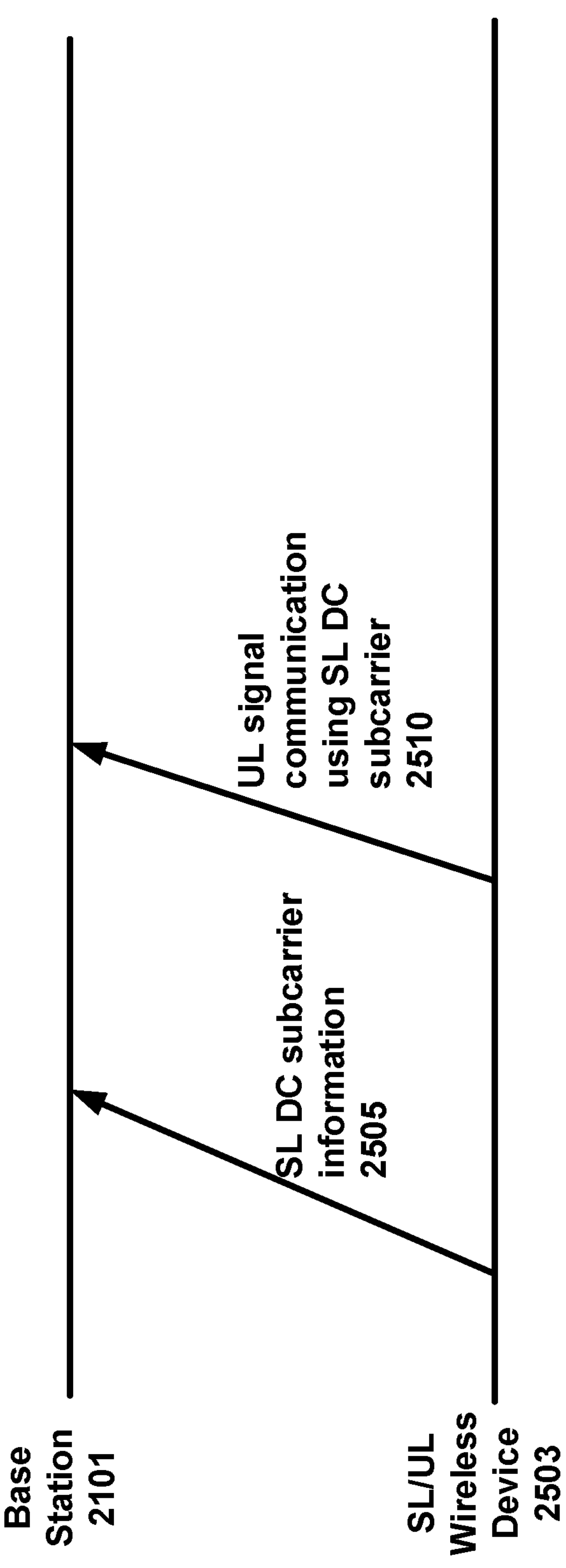
FIGS. 25A-C show example methods for coordinating direct current or direct conversion (DC) subcarriers between devices.
Figure 25B:
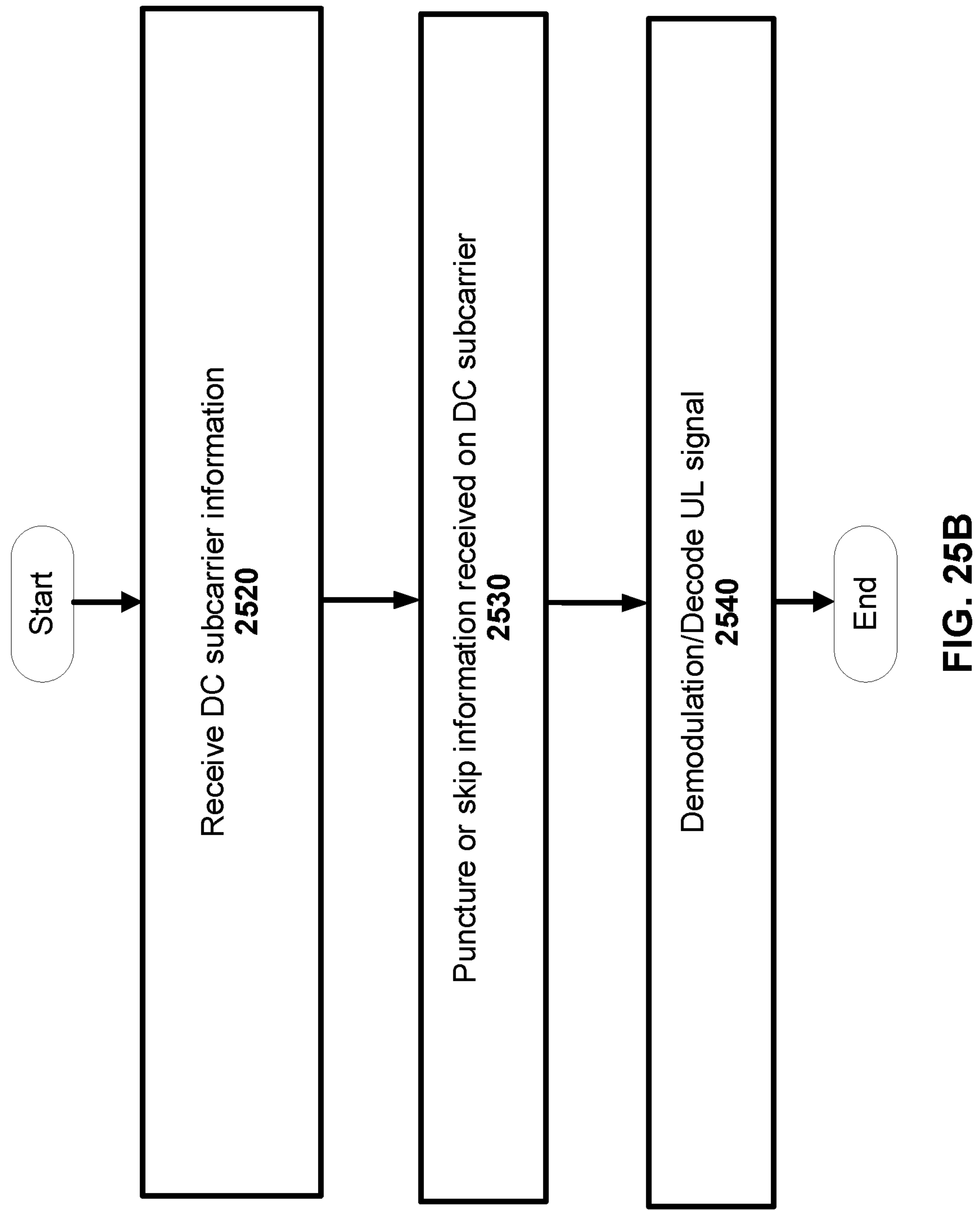
Figure 25C:
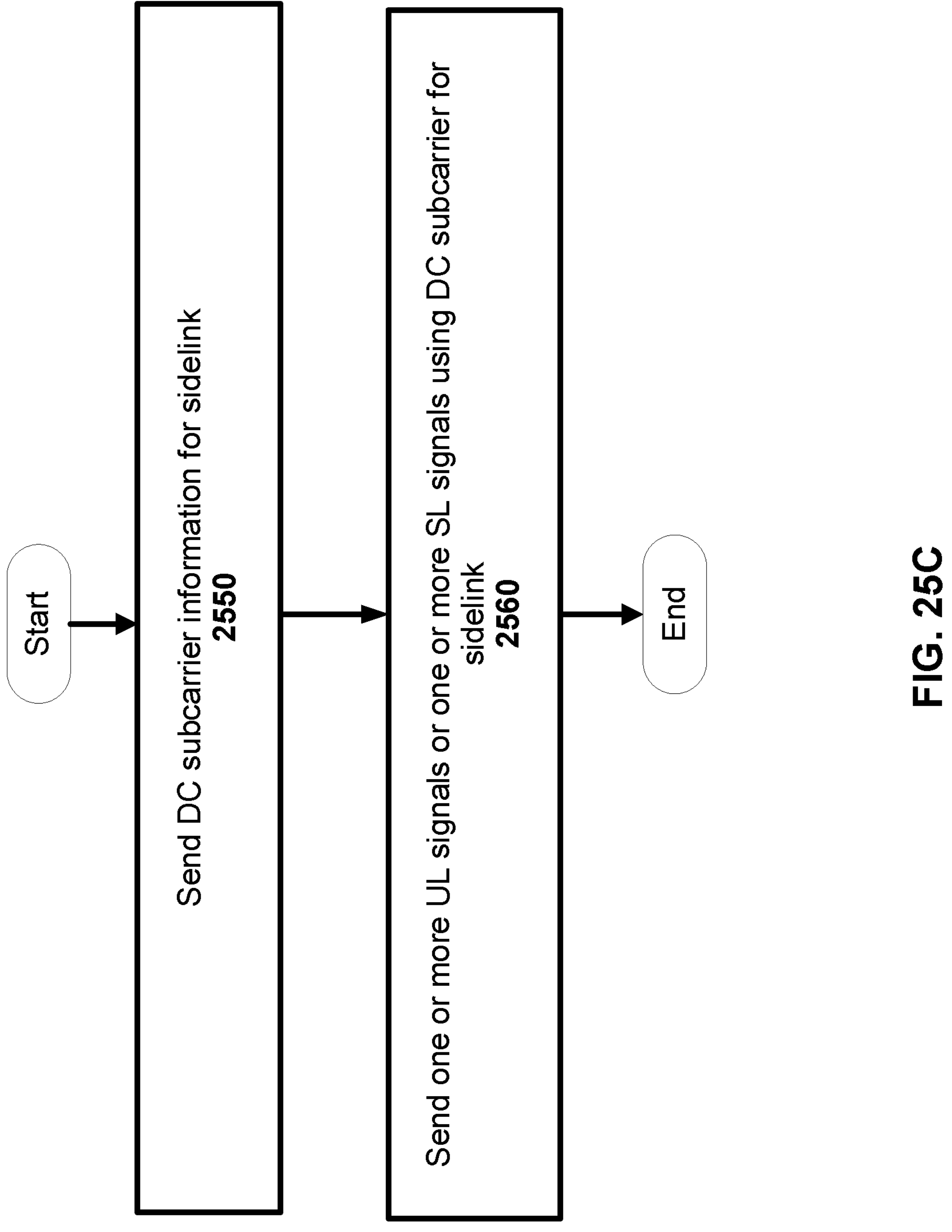

FIGS. 25A-25C show example methods for coordinating DC subcarriers between devices. Although one or more steps of the example methods of FIGS. 25A-25C are described for convenience as being performed by the base station 2101 and/or the wireless device 2503, one, some, or all of such steps may be performed by one or more other devices (e.g., a base station, a wireless device, a core network device, etc.), and/or steps may be distributed among one or more devices, including any devices such as those described in connection with FIGS. 1-24. One or more steps of the example methods of FIGS. 25A-25C may be rearranged, modified, repeated, and/or omitted.

A wireless device may frequently switch BWP, for example, if the UL BWP is configured separately from the SL BWP, and/or if the DC subcarrier of the UL BWP is different from the DC subcarrier of the SL BWP. Frequently switching BWP may cause unnecessary switching delays and may interrupt SL operation. The DC subcarrier of the UL BWP may be changed to match the DC subcarrier of the SL, for example, for a wireless device performing SL operation. The SL DC subcarrier may be fixed (e.g., may remain unchanged) to avoid and/or reduce the likelihood of degrading the SL reception performance of wireless devices in an RRC idle state. A wireless device may determine a DC subcarrier to use for SL communications. The wireless device may notify the base station 2101 of the determination. Different wireless devices within the coverage area of the base station 2101 may use different DC subcarriers (e.g., because each wireless device may determine its DC subcarrier independently).

At step 2505 of FIG. 25A, the wireless device 2503 may send its DC subcarrier information for SL BWP to the base station (e.g., via RRC message/signaling). The base station 2101 may use the SL DC subcarrier for UL reception, for example, instead of the DC subcarrier of the UL BWP. The base station 2101 may use the SL DC subcarrier for UL reception, for example, if the wireless device performs the SL operation and/or if the SL BWP is activated. At step 2520 of FIG. 25B, DC subcarrier information may be received. For example, a base station may receive, from a wireless device (e.g., via RRC message), DC subcarrier information for SL communication. At step 2530 of FIG. 25B, information received in the DC subcarrier may be punctured or skipped. The base station 2101 may puncture or skip information received on the DC subcarrier (e.g., the DC subcarrier indicated by the DC subcarrier information in step 2520), for example, if a UL signal is received from a wireless device (e.g., the wireless device in step 2520).

At step 2510 of FIG. 25A, the wireless device 2503 may send (e.g., transmit) a UL signal using the SL DC subcarrier corresponding to the subcarrier information sent in step 2505. The UL signal may be sent using the SL DC subcarrier, for example, if the wireless device 2503 is not performing an SL operation (e.g., it may send/transmit an UL signal using the DC subcarrier set in the UL BWP). The DC subcarrier set in SL BWP may be used for UL transmission, for example, if the SL transmission is performed, and/or if the SL BWP is activated. At step 2540 of FIG. 25B, UL signal may be demodulated/decoded. The base station 2101 may demodulate/decode UL signal from the wireless device, for example, based on DC subcarrier information (e.g., the DC subcarrier information received in step 2520).

At step 2550, a wireless device may send, to a base station, DC subcarrier information for SL via RRC. At step 2560, the wireless device may transmit one or more UL signals or one or more SL signals using DC subcarrier for SL, for example, if SL BWP is activated.

Figure 26:
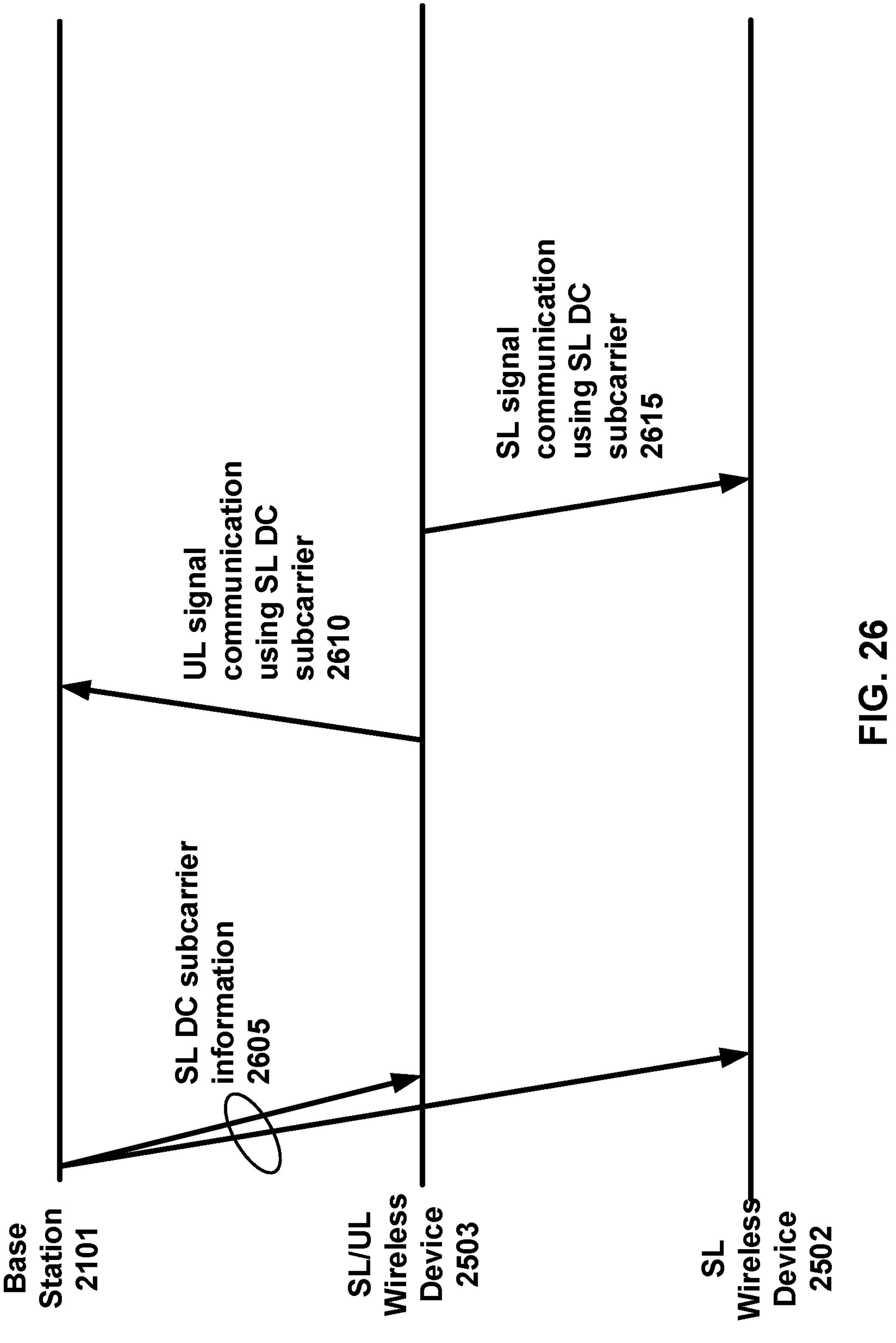
FIG. 26 shows an example method for coordinating DC subcarriers between devices.

FIG. 26 shows an example method for coordinating DC subcarriers between devices. The DC subcarrier of the UL BWP may be changed to match the DC subcarrier of the SL BWP, for example, which may reduce the amount of BWP switching a device performs. For example, by using the base station 2101 to determine the DC subcarrier, all of the wireless devices in coverage of the base station 2101 may use the same DC subcarrier for UL and/or SL communication. Although one or more steps of the example method of FIG. 26 are described for convenience as being performed by the base station 2101, the wireless device 2503, and/or the wireless device 2502, one, some, or all of such steps may be performed by one or more other devices (e.g., a base station, a wireless device, a core network device, etc.), and/or steps may be distributed among one or more devices, including any devices such as those described in connection with FIGS. 1-24. One or more steps of the example method of FIG. 26 may be rearranged, modified, repeated, and/or omitted.

At step 2605, the base station 2101 may assign the DC subcarrier of the SL BWP used by the wireless device 2503 (e.g., the wireless device 2503 may be the mode 1 wireless device 2103) and/or the wireless device 2502 (e.g., the wireless device 2502 may be the mode 2 wireless device 2102). For example, the base station 2101 may assign both device 2503 and device 2502 to use the same DC subcarrier for SL communications. The DC subcarrier of the SL BWP may be sent (e.g., signaled) to the device 2503 and/or the device 2502 via SIB and/or via RRC messages. Additionally or alternatively, the DC subcarrier information may be preconfigured, for example, for wireless devices that are outside coverage of the base station 2101. The DC subcarrier information may be preconfigured, for example, so that the SL wireless device uses the same DC subcarrier as the sending (e.g., transmitting) wireless device and the receiving wireless device. At step 2610, the wireless device 2503 may send a UL signal communication (e.g., transmission) using the SL DC subcarrier indicated by the information received in step 2605. For example, if the wireless device receives the information indicating the DC subcarrier of the SL BWP, the DC subcarrier set in the SL BWP may be used for the UL communication (e.g., transmission). At step 2615, the wireless device 2503 may send a SL signal communication (e.g., transmission), to the wireless device 2502, using the SL DC subcarrier indicated by the information received in step 2605.

Figure 27:
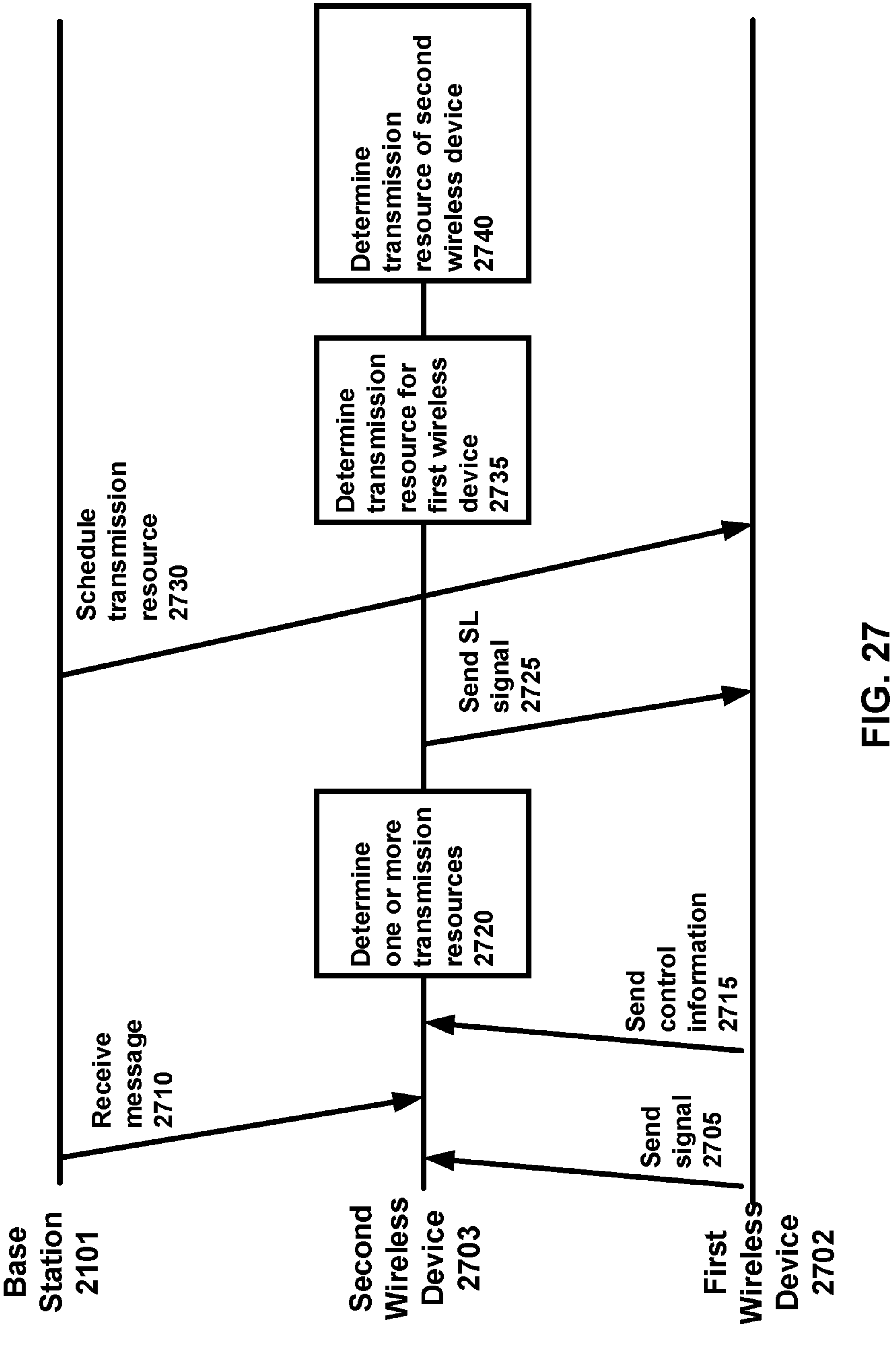
FIG. 27 shows an example method for coordinating communication resources of devices.

FIG. 27 shows an example method for coordinating communication resources of devices. Although one or more steps of the example method of FIG. 27 are described for convenience as being performed by the base station 2101, the second wireless device 2703, and/or the first wireless device 2702, one, some, or all of such steps may be performed by one or more other devices (e.g., a base station, a wireless device, a core network device, etc.), and/or steps may be distributed among one or more devices, including any devices such as those described in connection with FIGS. 1-26. One or more steps of the example method of FIG. 27 may be rearranged, modified, repeated, and/or omitted.

At step 2705, a first wireless device may send (e.g., transmit) an SL signal to a second wireless device. At step 2710, the second wireless device may receive, from a base station, a message. For example, the message may comprise a SIB, an RRC message, and/or physical layer control signal (e.g. physical layer downlink control channel (PDCCH)). The message may comprise configuration information of a plurality of sets of potential wireless communication reception resources for the first wireless device. At step 2715, the first wireless device may send higher layer (e.g., a MAC control element and/or an RRC message) and/or physical layer WIRELESS COMMUNICATION control information to the second wireless device, for example, to indicate which set of potential wireless communication reception resources (e.g., SL reception gap) is to be used (e.g., activated). At step 2720, the second wireless device may determine, based on the indicated set of potential wireless communication reception resources for the first wireless device, one or more communication (e.g., transmission) resources for wireless communication (e.g., transmission) to the first wireless device. At step 2725, the second wireless device may send (e.g., transmit) a SL signal using the determined resources. For example, a plurality of sets of potential wireless communication reception resources may each comprise different time interval sets indicating time periods during which a wireless communication signal may be received. For example, one or more sets of potential wireless communication reception resources may be configured for the second wireless device. One or more sets of potential wireless communication reception resources may be configured for the first wireless device. For example, the first wireless device may be expected to receive a wireless communication signal within at least one or more configured sets of potential wireless communication resources from the second wireless device.

At step 2730, the communication (e.g., transmission) resource of the first wireless device may be scheduled by the base station. For example, the first wireless device may be restricted from performing BWP switching within a set of potential wireless communication reception resources. At step 2735, the second wireless device may determine a communication (e.g., transmission) resource for sending information to the first wireless device. For example, the communication (e.g., transmission) resource may be within at least one set of the potential wireless communication receiving resources in the resource pool selected by the second wireless device. At step 2740, the second wireless device may determine a communication (e.g., transmission) resource of the second wireless device, wherein the communication (e.g., transmission) resources are selected only from resources that overlap with the indicated set of potential wireless communication resources in the resource pool. The second wireless device may determine that all resources are candidate communication (e.g., transmission) resources in the resource pool selected by the second wireless device, for example, if the second wireless device does not receive configuration information. The second wireless device may determine its communication (e.g., transmission) resource among resources in the resource pool selected by the second wireless device and/or in a plurality of sets of potential wireless communication reception resources, for example, if no higher layer (MAC control element or RRC message) or physical layer wireless communication control information is received from the first wireless device.

A wireless device may receive, from a base station RRC message. The RRC message may comprise configuration information of a DC subcarrier for a SL BWP. The wireless device may send (e.g., transmit) a SL signal using the DC subcarrier indicated by the base station.

A wireless device may send (e.g., transmit) one or more RRC messages. The one or more messages may comprise configuration information of DC subcarrier for SL BWP. The base station may receive a UL signal from the wireless device using the SL DC subcarrier. For example, the base station may receive a UL signal using the SL DC subcarrier instead of the DC subcarrier of the UL BWP if the wireless device performs the SL operation and/or if the SL BWP is activated.

Figure 28:
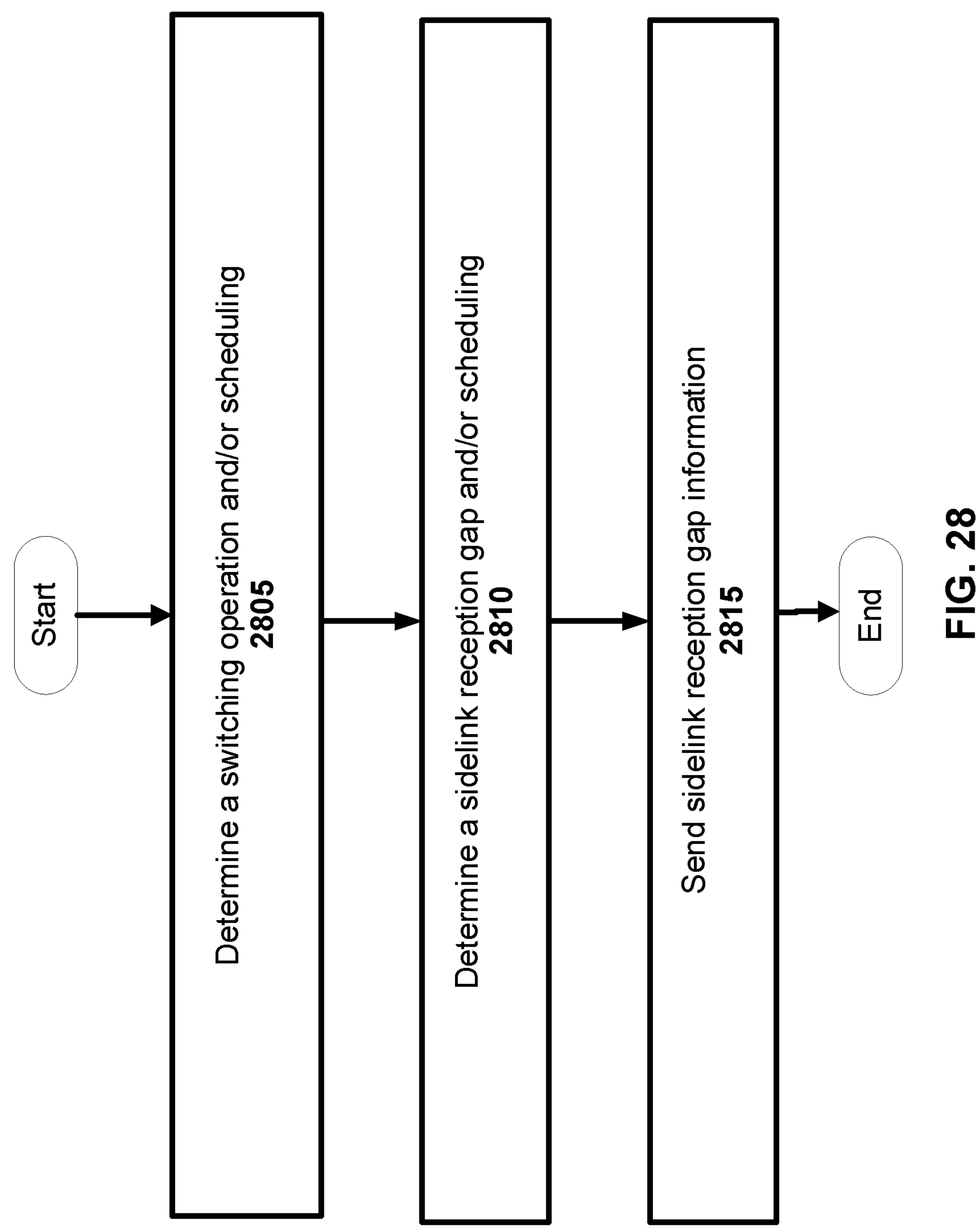
FIG. 28 shows an example method for coordinating communication resources of devices.

FIG. 28 shows an example method for coordinating communication resources of devices. Although one or more steps of the example method of FIG. 28 are described for convenience as being performed by the base station 2101, the mode 2 wireless device 2102, and/or the mode 1 wireless device 2103, one, some, or all of such steps may be performed by one or more other devices (e.g., a base station, a wireless device, a core network device, etc.), and/or steps may be distributed among one or more devices, including any devices such as those described in connection with FIGS. 1-27. One or more steps of the example method of FIG. 28 may be rearranged, modified, repeated, and/or omitted.

At step 2805, a switching operation and/or scheduling may be determined. For example, the base station 2101 may determine a Uu BWP switching operation and/or Uu scheduling for the Mode 1 wireless device 2103. At step 2810, a SL reception gap and/or scheduling may be determined. The base station 2101 may determine a SL reception gap for the mode 1 wireless device 2103, for example, based on Uu BWP switching and/or Uu scheduling for the mode 1 wireless device 2103 (e.g., the Uu BWP switching and/or Uu scheduling determined in step 2805). At step 2815, the SL reception gap information may be sent (e.g., transmitted). For example, the base station 2101 may send (e.g., transmit) SL reception gap information indicating the SL reception gap determined in step 2810 to the mode 2 wireless device 2102.

Figure 29:
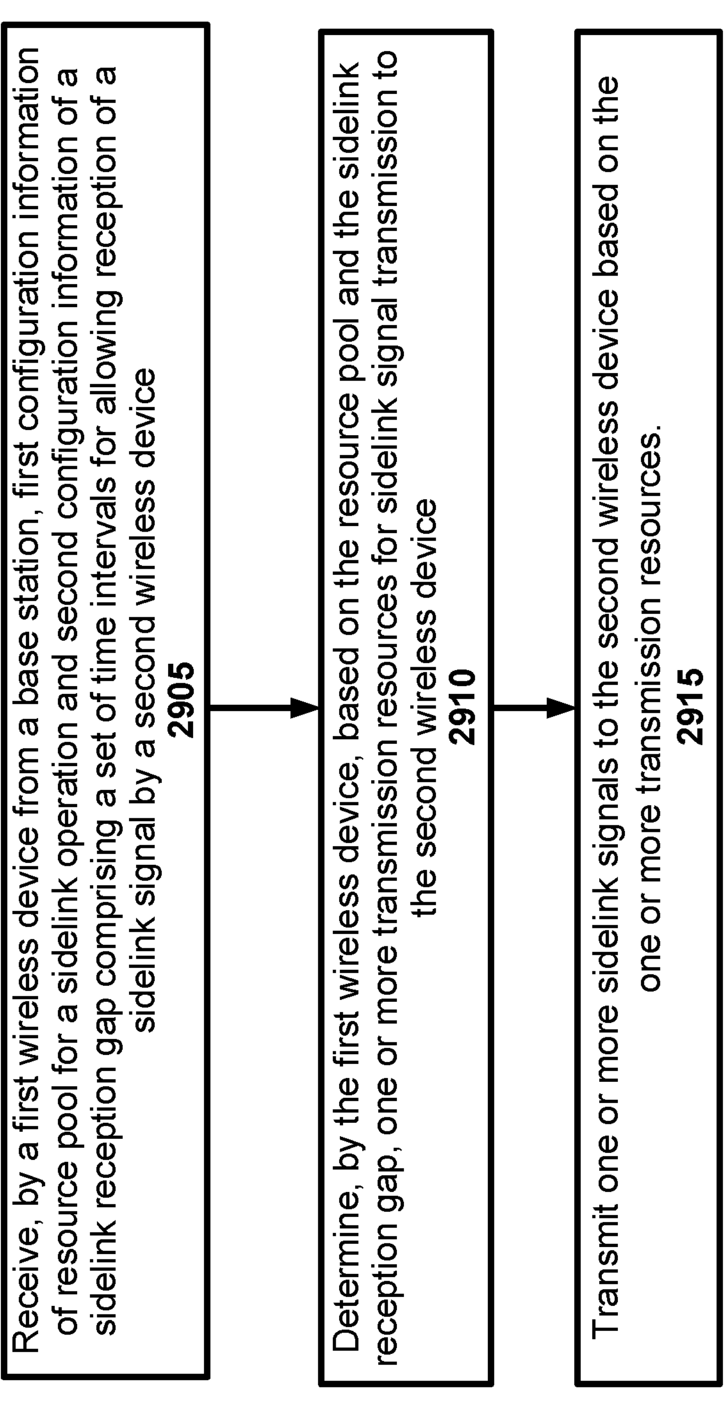
FIG. 29 shows an example method for configuring communication resources of devices.

FIG. 29 shows an example method for configuring communication resources of devices. A computer implemented method may include receiving, by a first wireless device from a base station, at least one message comprising: first configuration information of a resource pool for a sidelink operation; and second configuration information of a sidelink reception gap comprising a set of time intervals for allowing reception of a sidelink signal by the second wireless device (step 2905); determining, by the first wireless device, based on the resource pool and the sidelink reception gap, one or more transmission resources for sidelink signal transmission to the second wireless device (step 2910); and transmitting, by the first wireless device to the second wireless device, a sidelink signal based on the one or more transmission resources (step 2915). The second wireless device may be configured to be scheduled by the base station. The first wireless device may not expect the second wireless device to switch a bandwidth part within the sidelink reception gap. The method may further comprise determining, by the first wireless device, one or more transmission resources for the second wireless device within resources overlapping with the sidelink reception gap and the resource pool. The base station may transmit the first message to the first and the second wireless devices via system information block or radio resource control signal. The base station may transmit the second message to the first wireless device via system information block or radio resource control signal. The first wireless device may be configured to select the one or more transmission resources without receiving downlink control information comprising resource assignment for the one or more transmission resources. The sidelink signal transmitted by the first wireless device may comprise a physical layer sidelink control channel and a physical layer sidelink shared channel.

A first wireless device may perform a method comprising multiple operations. The first wireless device may receive, from a base station: an indication of a resource pool for sidelink communication; and an indication of a sidelink reception gap. The first wireless device may determine, based on the resource pool and the sidelink reception gap, at least one resource for sidelink signal transmission to a second wireless device. The first wireless device may send, to the second wireless device and using the at least one resource, a sidelink signal. The first wireless device may send, to the second wireless device, a request to establish a sidelink connection. The first wireless device may receive, from the second wireless device, a response to the request to establish the sidelink connection. The response may comprise sidelink gap information. The determining the at least one resource for sidelink signal transmission to the second wireless device may be further based on the sidelink gap information. The sidelink reception gap may comprise at least one of: a time interval for allowed sidelink signal transmission to the second wireless device; or a time interval for disallowed sidelink signal transmission to the second wireless device. The sidelink reception gap may be associated with at least one time interval during which bandwidth part switching does not occur for the second wireless device. The determining the at least one resource for sidelink transmission to the second wireless device may comprise determining the at least one resource from among at least one resource, of the resource pool, that overlaps with the sidelink reception gap. The receiving the indication of the resource pool for sidelink communication may be via a system information block or via a radio resource control signal. The receiving the indication of the sidelink reception gap may be via a system information block or via a radio resource control signal. The sending the sidelink signal may be via at least one of: a physical layer sidelink control channel; or a physical layer sidelink shared channel. The first wireless device may send, to the base station, information indicating a sidelink direct conversion (DC) subcarrier for the sidelink signal transmission. The first wireless device may send, to the base station, an uplink signal communication via the sidelink DC subcarrier. The wireless device may send, to the base station, information indicating a sidelink DC subcarrier for the sidelink signal transmission. The sending a sidelink signal may comprise sending a sidelink signal via the sidelink DC subcarrier. The first wireless device may receive, from the base station, an indication of a sidelink DC subcarrier to use for uplink and sidelink communication. The first wireless device may send, via the sidelink DC subcarrier, an uplink signal. The first wireless device may receive, from the base station, an indication of a sidelink DC subcarrier to use for uplink and sidelink communication. The sending a sidelink signal may comprise sending a sidelink signal via the sidelink DC subcarrier. The first wireless device may receive, from the base station and via one or more SIB or RRC messages, an indication of a sidelink DC subcarrier to use for uplink and sidelink communication.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the indication of a sidelink reception gap. A computer-readable medium may store instructions that, when executed, cause performance of the described method, additional operations and/or include the additional elements.

A first wireless device may perform a method comprising multiple operations. The first wireless device may receive, from a base station: an indication of a resource pool for sidelink communication; and an indication of a sidelink reception gap. The first wireless device may receive, from a second wireless device, a first message associated with establishing a sidelink connection between the first wireless device and the second wireless device. The first wireless device may send, based on the sidelink reception gap, a second message comprising sidelink gap information. The first wireless device may receive, from the second wireless device and using at least one resource associated with the sidelink gap information, a sidelink signal. The first wireless device may determine, based on the resource pool and the sidelink reception gap, the sidelink gap information. The sending the second message may comprise sending, by the first wireless device to the second wireless device, the second message. The sending the second message may comprise sending, by the first wireless device to the base station, the second message. The sidelink reception gap may comprise at least one of: a time interval for allowed sidelink signal transmission to the second wireless device; or a time interval for disallowed sidelink signal transmission to the second wireless device. The sidelink reception gap may be associated with at least one time interval during which bandwidth part switching does not occur for the first wireless device. The receiving the indication of the resource pool for sidelink communication may be via a system information block or via a radio resource control signal. The receiving the indication of the sidelink reception gap may be via a system information block or via a radio resource control signal. The receiving the sidelink signal may be via at least one of: a physical layer sidelink control channel; or a physical layer sidelink shared channel.

Systems, devices, and media may be configured with the method. A wireless device may comprise one or more processors; and memory storing instructions that, when executed, cause the wireless device to perform the described method, additional operations and/or include the additional elements. A system may comprise a first wireless device configured to perform the described method, additional operations and/or include the additional elements; and a second wireless device configured to send the sidelink signal. A computer-readable medium may store instructions that, when executed, cause performance of the described method, additional operations and/or include the additional elements.

A base station may perform a method comprising multiple operations. The base station may send to a first wireless device: an indication of a resource pool for sidelink communication; and an indication of a sidelink reception gap. The base station may receive from a second wireless device, sidelink gap information, wherein the sidelink gap information is associated with the sidelink reception gap. The base station may determine, based on the sidelink gap information, at least one resource assigned to sidelink signal transmission between the first wireless device and the second wireless device. The base station may send, to at least one of the first wireless device or the second wireless device, a downlink signal via resources that do not overlap with the at least one resource assigned to sidelink signal transmission. The sidelink reception gap may comprise at least one of: a time interval for allowed sidelink signal transmission to the second wireless device; or a time interval for disallowed sidelink signal transmission to the second wireless device. The sidelink reception gap may be associated with at least one time interval during which bandwidth part switching does not occur for the second wireless device. The sidelink gap information may indicate the at least one resource, assigned to sidelink signal transmission, from among at least one resource, of the resource pool, that overlaps with the sidelink reception gap. The sending the indication of the resource pool for sidelink communication may be via a system information block or via a radio resource control signal. The sending the indication of the sidelink reception gap may be via a system information block or via a radio resource control signal. The at least one resource assigned to sidelink signal transmission may be for transmission via at least one of: a physical layer sidelink control channel; or a physical layer sidelink shared channel.

Systems, devices, and media may be configured with the method. A computing device may comprise one or more processors; and memory storing instructions that, when executed, cause the computing device to perform the described method, additional operations and/or include the additional elements. A system may comprise a base station configured to perform the described method, additional operations and/or include the additional elements; and a wireless device configured to receive the indication of the sidelink reception gap. A computer-readable medium may store instructions that, when executed, cause performance of the described method, additional operations and/or include the additional elements.

A first wireless device may perform a method comprising multiple operations. The first wireless device may receive, from a base station, at least one message comprising: first configuration information of a resource pool for a sidelink communication; and second configuration information of a sidelink reception gap comprising a set of time intervals for allowing reception of a sidelink signal by a second wireless device. The first wireless device may determine, based on the resource pool and the sidelink reception gap, one or more transmission resources for sidelink signal transmission to the second wireless device. The first wireless device may transmit, to the second wireless device, a sidelink signal based on the one or more transmission resources. The second wireless device may be configured to be scheduled by the base station. The first wireless device may not expect the second wireless device to switch a bandwidth part within the sidelink reception gap. The first wireless device may determine, one or more transmission resources for the second wireless device within resources overlapping with the sidelink reception gap and the resource pool. The base station may transmit the first configuration information to the first wireless device and the second wireless device via system information block or radio resource control signal. The base station may transmit the second configuration information to the first wireless device via system information block or radio resource control signal. The first wireless device may be configured to select the one or more transmission resources without receiving downlink control information comprising resource assignment for the one or more transmission resources. The sidelink signal transmitted by the first wireless device may comprise a physical layer sidelink control channel and a physical layer sidelink shared channel.

Figure 30:
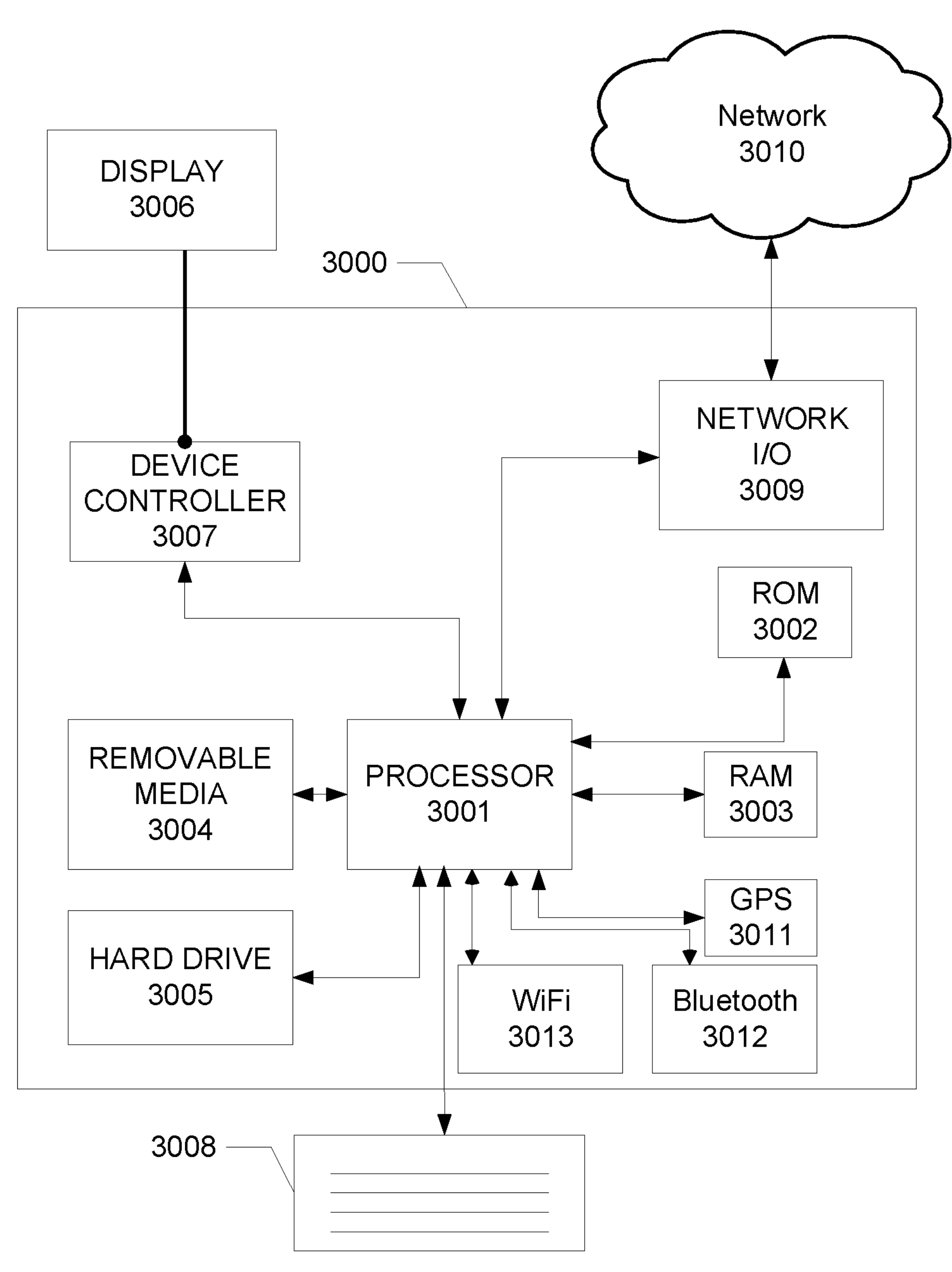
FIG. 30 shows example elements of a computing device that may be used to implement any of the various devices described herein.

FIG. 30 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3000 may include one or more processors 3001, which may execute instructions stored in the random-access memory (RAM) 3003, the removable media 3004 (such as a Universal Serial Bus (USB) drive, compact disk (CD) or digital versatile disk (DVD), or floppy disk drive), or any other desired storage medium. Instructions may also be stored in an attached (or internal) hard drive 3005. The computing device 3000 may also include a security processor (not shown), which may execute instructions of one or more computer programs to monitor the processes executing on the processor 3001 and any process that requests access to any hardware and/or software components of the computing device 3000 (e.g., ROM 3002, RAM 3003, the removable media 3004, the hard drive 3005, the device controller 3007, a network interface 3009, a GPS 3011, a Bluetooth interface 3012, a WiFi interface 3013, etc.). The computing device 3000 may include one or more output devices, such as the display 3006 (e.g., a screen, a display device, a monitor, a television, etc.), and may include one or more output device controllers 3007, such as a video processor. There may also be one or more user input devices 3008, such as a remote control, keyboard, mouse, touch screen, microphone, etc.

The computing device 3000 may also include one or more network interfaces, such as a network interface 3009, which may be a wired interface, a wireless interface, or a combination of the two. The network interface 3009 may provide an interface for the computing device 3000 to communicate with a network 3010 (e.g., a RAN, or any other network). The network interface 3009 may include a modem (e.g., a cable modem), and the external network 3010 may include communication links, an external network, an in-home network, a provider's wireless, coaxial, fiber, or hybrid fiber/coaxial distribution system (e.g., a DOCSIS network), or any other desired network. Additionally, the computing device 3000 may include a location-detecting device, such as a global positioning system (GPS) microprocessor 3011, which may be configured to receive and process global positioning signals and determine, with possible assistance from an external server and antenna, a geographic position of the computing device 3000.

The example in FIG. 30 may be a hardware configuration, although the components shown may be implemented as software as well. Modifications may be made to add, remove, combine, divide, etc. components of the computing device 3000 as desired. Additionally, the components may be implemented using basic computing devices and components, and the same components (e.g., processor 3001, ROM storage 3002, display 3006, etc.) may be used to implement any of the other computing devices and components described herein. For example, the various components described herein may be implemented using computing devices having components such as a processor executing computer-executable instructions stored on a computer-readable medium, as shown in FIG. 30. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a first wireless device from a base station:

an indication of a plurality of resources for communication between wireless devices; and an indication of a time interval for a resource switching; and sending, by the first wireless device to a second wireless device and using at least one resource of the plurality of resources and outside the time interval, a signal transmission.

2. The method of claim 1, further comprising:

sending, by the first wireless device to the second wireless device, a request to establish a connection with the second wireless device; and receiving, by the first wireless device from the second wireless device, a response to the request to establish the connection, wherein the response comprises gap information.

3. The method of claim 1, further comprising:

receiving, by the first wireless device from the base station, an indication of a second time interval during which signal transmission between the first wireless device and the second wireless device is allowed.

4. The method of claim 1, wherein the resource switching comprises a bandwidth part switching for the second wireless device.

5. The method of claim 1, wherein the sending comprises sending the signal transmission via at least one of:

a physical layer sidelink control channel; or a physical layer sidelink shared channel.

6. The method of claim 1, wherein the at least one resource overlaps with a reception gap that is associated with one or more of: an offset, a symbol, a slot, a subframe, a frame, a bitmap, or a periodicity.

7. The method of claim 1, wherein the receiving the indication of the plurality of resources comprises:

receiving, by the first wireless device from the base station, an indication of a resource pool for communication with the second wireless device, wherein the resource pool comprises the plurality of resources.

8. The method of claim 1, wherein the indication of the time interval comprises at least one of;

a first value indicating an offset, or a second value indicating a number of time units, and wherein the time interval is configured by the base station.

9. The method of claim 1, wherein signal transmission between the first wireless device and the second wireless device is disallowed, and wherein the resource switching comprises switching one or more resources between the first wireless device and the base station.

10. A first wireless device comprising:

one or more processors; and memory storing instructions that, when executed by the one or more processors, configure the first wireless device to:

receive, from a base station:

an indication of a plurality of resources for communication between wireless devices; and an indication of a time interval for a resource switching; and send, to a second wireless device and using at least one resource of the plurality of resources and outside the time interval, a signal transmission.

11. The first wireless device of claim 10, wherein the instructions, when executed by the one or more processors, further configure the first wireless device to:

send, to the second wireless device, a request to establish a connection with the second wireless device; and receive, from the second wireless device, a response to the request to establish the connection, wherein the response comprises gap information.

12. The first wireless device of claim 10, wherein the instructions, when executed by the one or more processors, further configure the first wireless device to:

receive, from the base station, an indication of a second time interval during which signal transmission between the first wireless device and the second wireless device is allowed.

13. The first wireless device of claim 10, wherein the resource switching comprises a bandwidth part switching for the second wireless device.

14. The first wireless device of claim 10, wherein the instructions, when executed by the one or more processors, configure the first wireless device to send the signal transmission by sending the signal transmission via at least one of:

a physical layer sidelink control channel; or a physical layer sidelink shared channel.

15. The first wireless device of claim 10, wherein the at least one resource overlaps with a reception gap that is associated with one or more of: an offset, a symbol, a slot, a subframe, a frame, a bitmap, or a periodicity.

16. The first wireless device of claim 10, wherein the instructions, when executed by the one or more processors, configure the first wireless device to receive the indication of the plurality of resources by:

receiving, from the base station, an indication of a resource pool for communication with the second wireless device, wherein the resource pool comprises the plurality of resources.

17. A non-transitory computer-readable medium storing instructions that, when executed, cause:

receiving, by a first wireless device from a base station:

an indication of a plurality of resources for communication between wireless devices; and an indication of a time interval for a resource switching; and sending, by the first wireless device to a second wireless device and using at least one resource of the plurality of resources and outside the time interval, a signal transmission.

18. The non-transitory computer-readable medium of claim 17, wherein the instructions, when executed, further cause:

sending, by the first wireless device to the second wireless device, a request to establish a connection with the second wireless device; and receiving, by the first wireless device from the second wireless device, a response to the request to establish the connection, wherein the response comprises gap information.

19. The non-transitory computer-readable medium of claim 17, wherein the instructions, when executed, further cause:

receiving, by the first wireless device from the base station, an indication of a second time interval during which signal transmission between the first wireless device and the second wireless device is allowed.

20. The non-transitory computer-readable medium of claim 17, wherein the resource switching comprises a bandwidth part switching for the second wireless device.

21. The non-transitory computer-readable medium of claim 17, wherein the instructions, when executed, cause the sending by sending the signal transmission via at least one of:

a physical layer sidelink control channel; or a physical layer sidelink shared channel.

22. The non-transitory computer-readable medium of claim 17, wherein the at least one resource overlaps with a reception gap that is associated with one or more of: an offset, a symbol, a slot, a subframe, a frame, a bitmap, or a periodicity.

23. The non-transitory computer-readable medium of claim 17, wherein the instructions, when executed, cause the receiving the indication of the plurality of resources by:

receiving, by the first wireless device from the base station, an indication of a resource pool for communication with the second wireless device, wherein the resource pool comprises the plurality of resources.

24. A system comprising:

a first wireless device; and a base station configured to:

send, to the first wireless device:

an indication of a plurality of resources for communication between wireless devices; and an indication of a time interval for a resource switching, wherein the first wireless device is configured to:

send, to a second wireless device and using at least one resource of the plurality of resources and outside the time interval, a signal transmission.

25. The system of claim 24, wherein the first wireless device is further configured to:

send, to the second wireless device, a request to establish a connection with the second wireless device; and receive, from the second wireless device, a response to the request to establish the connection, wherein the response comprises gap information.

26. The system of claim 24, wherein the base station is further configured to:

send, to the first wireless device, an indication of a second time interval during which signal transmission between the first wireless device and the second wireless device is allowed.

27. The system of claim 24, wherein the resource switching comprises a bandwidth part switching for the second wireless device.

28. The system of claim 24, wherein the first wireless device is configured to send the signal transmission by:

sending the signal transmission via at least one of:

a physical layer sidelink control channel; or a physical layer sidelink shared channel.

29. The system of claim 24, wherein the at least one resource overlaps with a reception gap that is associated with one or more of: an offset, a symbol, a slot, a subframe, a frame, a bitmap, or a periodicity.

30. The system of claim 24, wherein the base station is further configured to send the indication of the plurality of resources by:

sending, to the first wireless device, an indication of a resource pool for communication with the second wireless device, wherein the resource pool comprises the plurality of resources.

* * * * *